US012168351B2

(12) United States Patent
Nose et al.

(10) Patent No.: US 12,168,351 B2
(45) Date of Patent: Dec. 17, 2024

(54) LIQUID EJECTING DEVICE

(71) Applicant: SEIKO EPSON CORPORATION, Tokyo (JP)

(72) Inventors: Hiroshi Nose, Shiojiri (JP); Tomoji Suzuki, Matsumoto (JP); Manabu Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 18/066,595

(22) Filed: Dec. 15, 2022

(65) Prior Publication Data

US 2023/0191787 A1 Jun. 22, 2023

(30) Foreign Application Priority Data

Dec. 16, 2021 (JP) ................................ 2021-204010
Dec. 16, 2021 (JP) ................................ 2021-204011

(51) Int. Cl.
*B41J 2/165* (2006.01)
*B41J 3/28* (2006.01)

(52) U.S. Cl.
CPC ....... *B41J 2/16535* (2013.01); *B41J 2/16508* (2013.01); *B41J 2/16523* (2013.01); *B41J 3/28* (2013.01); *B41J 2002/1655* (2013.01)

(58) Field of Classification Search
CPC ...... B41J 25/001; B41J 2/04586; B41J 2/245; B41J 2/2117; B41J 2/16535; B41J 2/16508; B41J 2/16523; B41J 2002/1655
See application file for complete search history.

(56) References Cited

U.S. PATENT DOCUMENTS

2008/0238957 A1* 10/2008 Hayashi ............... B41J 2/17509
347/85
2014/0247311 A1 9/2014 Yoshida et al.

FOREIGN PATENT DOCUMENTS

JP 2005-119139 A 5/2005
JP 2010-042592 A 2/2010
JP 2011-088103 A 5/2011
JP 2014-168854 A 9/2014

* cited by examiner

*Primary Examiner* — Thinh H Nguyen
(74) *Attorney, Agent, or Firm* — WORKMAN NYDEGGER

(57) ABSTRACT

A liquid ejecting device includes a base portion, a liquid ejecting portion movably provided at the base portion, a medium supporting portion provided at the base portion and configured to support a printing medium in a printing region where the liquid ejecting portion performs printing, and a maintenance portion disposed in a region on the +X direction side of the printing region in the X-axis direction in the base portion. The maintenance portion includes a moisturizing portion that can form a closed space to which nozzle opens, a cleaning portion that can forcibly discharge liquid from the nozzle, and a wiper that can wipe a nozzle surface where the nozzle is provided. The moisturizing portion, the cleaning portion and the wiper are disposed side by side in the Y-axis direction.

7 Claims, 14 Drawing Sheets

LIQUID EJECTING DEVICE

The present application is based on, and claims priority from JP Application Serial Number 2021-204010, filed Dec. 16, 2021, and 2021-204011, filed Dec. 16, 2021, the disclosures of which are hereby incorporated by reference herein in its entirety.

BACKGROUND

1. Technical Field

The present disclosure relates to a liquid ejecting device.

2. Related Art

JP-A-2010-42592 discloses an ink-jet printer as an example of a liquid ejecting device including a printer head that performs printing by ejecting ink from a nozzle to a medium placed on a vacuum table provided at a main body frame. The printer head is an example of a liquid ejecting portion, the main body frame is an example of a base portion, the vacuum table is an example of a medium supporting portion, and the ink is an example of liquid. In addition, it is disclosed that the ink-jet printer performs printing in such a manner that the printing portion that movably holds the printer head in the scanning direction moves in the depth direction that intersects the scanning direction with respect to the medium placed at the vacuum table. In addition, it is disclosed that the printing portion is provided with a suction portion that can perform cleaning by forcibly discharging the ink from the nozzle, and a wiper portion that can wipe the nozzle surface of the nozzle such that the suction portion and the wiper portion are disposed side by side in the scanning direction. The suction portion is an example of a cleaning portion, and the wiper is an example of a wiping portion.

However, when the maintenance portions such as the suction portion and the wiper portion for the maintenance of the printer head disclosed in JP-A-2010-42592 are provided in the movable printing portion, the size of the ink-jet printer may be increased.

SUMMARY

A liquid ejecting device includes a base portion, a liquid ejecting portion provided at the base portion so as to be movable in a depth direction of the base portion and a scanning direction that intersects the depth direction, the liquid ejecting portion being configured to perform printing by ejecting liquid from a nozzle to a medium, and a medium supporting portion provided at the base portion and configured to support the medium in a printing region where the liquid ejecting portion performs the printing, a maintenance portion provided at the base portion and disposed on one side in outside of the printing region in the scanning direction. the maintenance portion includes a moisturizing portion configured to form a closed space to which the nozzle opens, a cleaning portion configured to perform cleaning by forcibly discharging the liquid from the nozzle, and a wiper configured to wipe a nozzle surface where the nozzle is provided, and the moisturizing portion, the cleaning portion and the wiper are disposed side by side in the depth direction.

DESCRIPTION OF EXEMPLARY EMBODIMENTS

Figure 1:
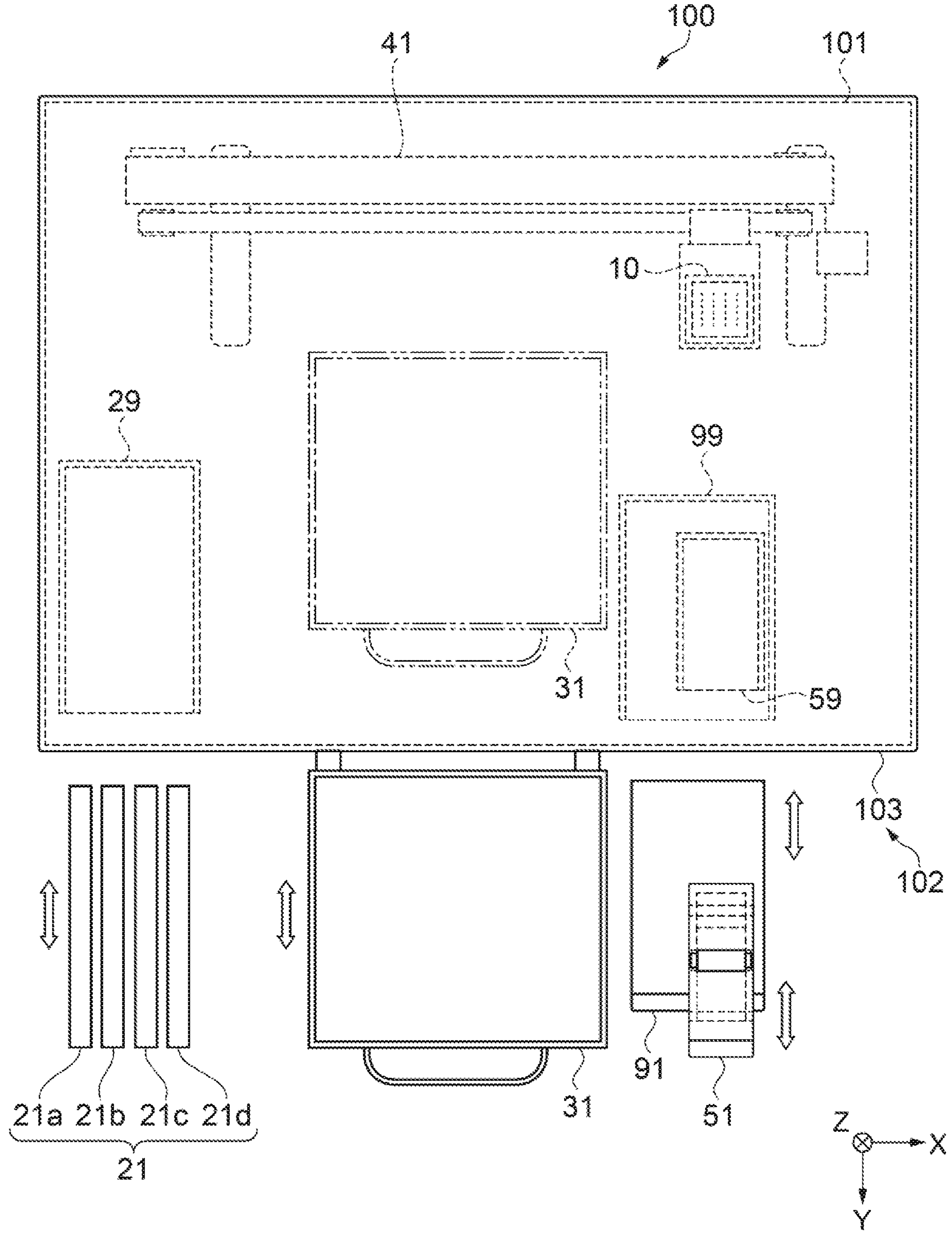
FIG. 1 is a schematic plan view illustrating an external appearance of a liquid ejecting device of an embodiment of the present disclosure.

The present disclosure is described below based on embodiments. In each drawing, the same member is denoted with the same reference numeral, and overlapping descriptions are omitted. Note that in the present specification, "same" and "identical" not only mean being exactly the same, but encompass cases where they are the same in consideration of measurement errors, cases where they are the same in consideration of manufacturing variations of components, and cases where they are the same to the extent that functions are not impaired. Therefore, for example, "members with the same dimension" means that the dimensional difference between components is within ±10%, preferably ±5%, more preferably ±3% of one component in consideration of measurement errors and manufacturing variations of components.

In addition, in each drawing, X, Y and Z are three spatial axes orthogonal to each other. In the present specification, the directions along these axes are the X-axis direction, Y-axis direction, and Z-axis direction. When specifying the directions, the directions are denoted with positive and negative signs, "+" for the positive direction and "−" for the negative direction, and description is made with the direction pointed by the arrow in each drawing as +direction and the direction opposite to the arrow as−direction.

In addition, the Z-axis direction is the gravity direction, the +Z direction is the vertically downward direction, and the −Z direction is the vertically upward direction. In addition, description will be made with a plane including the X axis and the Y axis as the X-Y plane, a plane including the X axis and the Z axis as the X-Z plane, and a plane including the Y axis and the Z axis as the Y-Z plane. In addition, the X-Y plane is a horizontal plane. Further, the three X, Y and Z spatial axes not specifying the positive direction or the negative direction are described as the X axis, the Y axis and the Z axis.

1. Embodiment 1

In this embodiment, a liquid ejecting device 100 is configured as an ink-jet printer, and forms an image by ejecting ink to a printing medium M. The printing medium M is an example of a medium. The ink is an example of liquid. The printing medium M is not limited to a sheet, and may be a plastic film, a plate member, a hard panel, a corrugated cardboard or the like, and may be cloth or clothing such as T-shirts.

Figure 2:
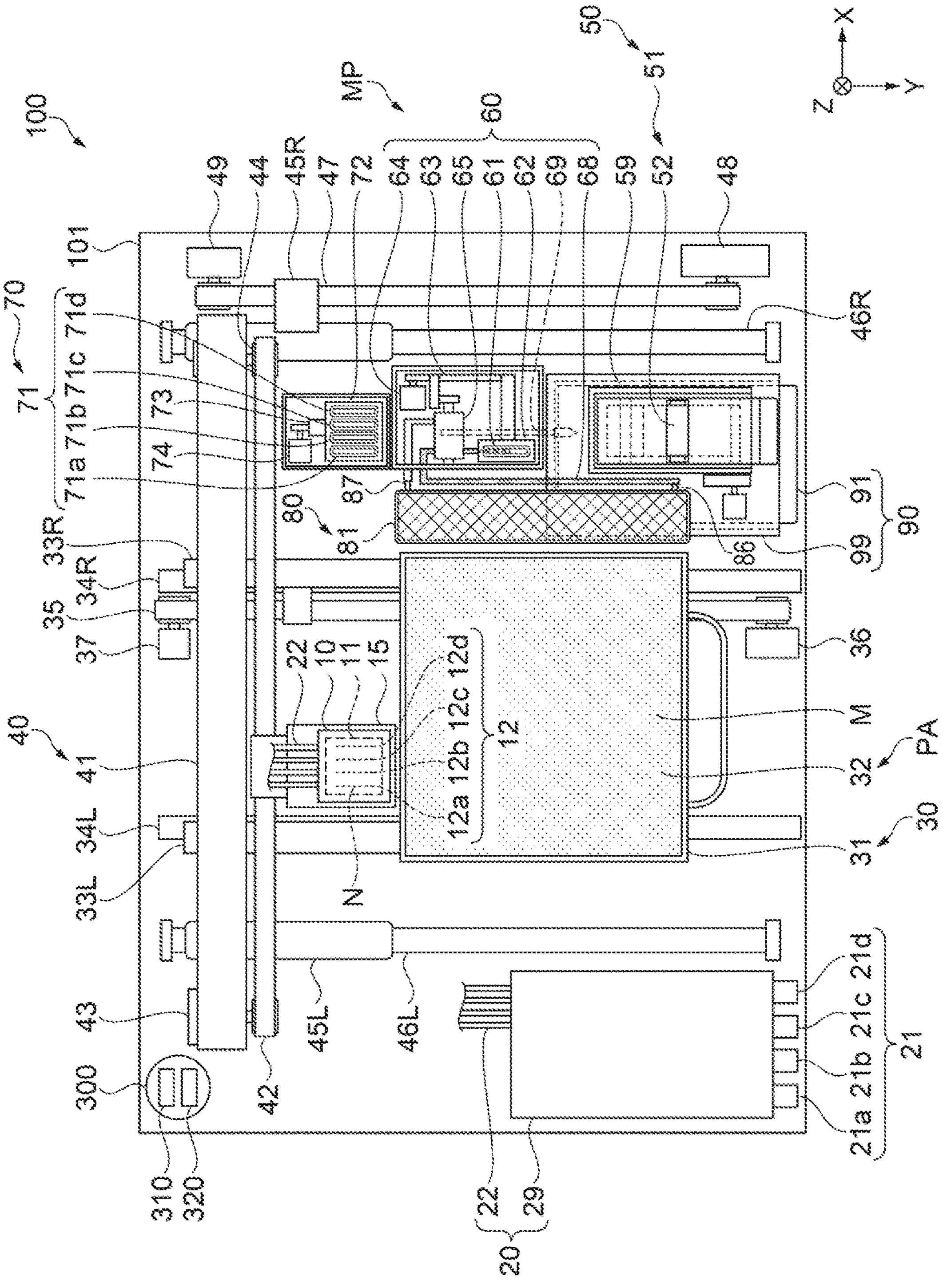
FIG. 2 is a schematic plan view illustrating a schematic configuration of the liquid ejecting device.

As illustrated in FIGS. 1 and 2, the liquid ejecting device 100 includes, in a rectangular box-shaped housing formed by a plate-shaped base portion 101 and an exterior member 102, a liquid ejecting portion 10, an ink supply portion 20, a medium support mechanism 30, a ejecting portion moving mechanism 40, a maintenance portion MP and a control portion 300.

The liquid ejecting portion 10 includes a nozzle surface 11 provided with a plurality of nozzle rows 12 that eject ink in the +Z direction. The liquid ejecting portion 10 is mounted in a carriage 15 described later in an orientation in which the nozzle surface 11 is along the X-Y plane. The Z-axis direction along the +Z direction is an example of a normal direction of the nozzle surface 11. The nozzle row 12 is formed of a plurality of nozzles N disposed side by side in the Y-axis direction. In a printing region PA, the liquid ejecting portion 10 performs printing on the printing medium M by ejecting ink in the +Z direction from the plurality of nozzles N making up the nozzle row 12 by driving and controlling a ejecting element not illustrated in the drawing. In this embodiment, the plurality of nozzle rows 12 include a nozzle row 12*a*, a nozzle row 12*b*, a nozzle row 12*c* and a nozzle row 12*d*.

Examples of the ink to be ejected are inks of four colors, black, cyan, magenta and yellow, and the inks are ejected from the nozzle row 12*a*, the nozzle row 12*b*, the nozzle row 12*c* and the nozzle row 12*d*. Note that the color is not limited to the above-mentioned four colors, and inks of any color such as light cyan, light magenta and white may be ejected. The liquid ejecting portion 10 is mounted in the carriage 15 provided in the ejecting portion moving mechanism 40, and moves in the X-axis direction and the Y-axis direction together with the movement of the carriage 15.

The ink supply portion 20 supplies ink to the liquid ejecting portion 10. The ink supply portion 20 includes a liquid container 21, a supply channel 22, and a liquid container mounting portion 29 that can be mounted in the liquid container 21. The liquid container mounting portion 29 is an example of a second mounting portion. As illustrated in FIGS. 1 to 8, the liquid container mounting portion 29 is attached to a base portion 101. As illustrated in FIGS. 1 and 2, the liquid container mounting portion 29 is provided in a region on the −X direction side of the printing region PA in the X-axis direction and on the +Y direction side than the center of the base portion 101 in the Y-axis direction.

The liquid container mounting portion 29 is provided such that the liquid container 21 can be attached and detached from a front surface 103 of the exterior member 102 on the +Y direction side in the Y-axis direction. The region on the −X direction side of the printing region PA in the X-axis direction is an example of the other side of the outside of the printing region PA in the X-axis direction. The Y-axis direction is an example of the depth direction of the base portion 101. In this embodiment, the depth direction is the +Y direction and the −Y direction. In addition, the +Y direction side is an example of a near side of the base portion 101, and the −Y direction side is an example of a far side of the base portion 101.

In this embodiment, a plurality of the liquid containers 21 include a liquid container 21*a* that contains black ink, a liquid container 21*b* that contains ink cyan, a liquid container 21*c* that contains magenta ink, and a liquid container 21*d* that contains yellow ink.

The liquid of containers 21*a*, 21*b*, 21*c* and 21*d* of this embodiment are mounted in the liquid container mounting portion 29 in the state where they are disposed side by side in the X-axis direction, but they may be mounted in the liquid container mounting portion 29 in the state where they are disposed side by side in the Z-axis direction. In addition, the liquid container 21 of this embodiment is a replaceable cartridge tank, but it may be a replenishment type tank including an injection portion that can inject ink and a container chamber that contains the ink injected from the injection portion. In this case, the ink supply portion 20 includes the liquid container 21.

The supply channel 22 connects the liquid container 21 and the liquid ejecting portion 10 such that the ink contained in the liquid container 21 flows toward the liquid ejecting portion 10. The supply channel 22 connects the liquid container 21 mounted to the liquid container mounting portion 29 and the liquid ejecting portion 10 provided in the carriage 15. The supply channel 22 of this embodiment is composed of a flexible resin tube, for example.

The medium support mechanism 30 supports the printing medium M in the printing region PA where the liquid ejecting portion 10 performs printing on the printing medium M. The medium support mechanism 30 includes a medium supporting portion 31 that supports the printing medium M. The medium supporting portion 31 includes a medium support surface 32 that supports the printing medium M, and a pair of sliding parts 33L and 33R provided with a distance therebetween in the X-axis direction.

The medium support mechanism 30 supports the medium supporting portion 31 so as to be movable to a printing position illustrated in FIG. 2 and a set position illustrated in FIG. 1. The set position is a position where the printing medium M can be set to the medium supporting portion 31. The printing position is a position where the liquid ejecting portion 10 performs printing on the printing medium M supported by the medium supporting portion 31. As such, in this embodiment, the range of the medium support surface 32 of the medium supporting portion 31 located at the printing position when the liquid ejecting device 100 is viewed from the −Z direction as illustrated in FIG. 2 is the printing region PA. In FIG. 2, the printing region PA is the range represented by the dot pattern. The set position is located on the +Y direction side with respect to the printing position and on the +Y direction side than the front surface 103 of the exterior member 102. In FIG. 1, the medium supporting portion 31 located at the printing position is illustrated with the chain double-dashed line.

The medium support mechanism 30 includes a pair of guide rails 34L and 34R that slidably guides the sliding parts 33L and 33R of the medium supporting portion 31 in the Y-axis direction, and a conveyance belt 35 to which the sliding part 33R is fixed, a conveyance motor 36, and a pulley 37. The guide rails 34L and 34R are attached to the base portion 101. Thus, the medium supporting portion 31 is movably attached to the base portion 101. The conveyance belt 35 is wound between the conveyance motor 36 and the pulley 37. When the conveyance motor 36 is driven and controlled, the conveyance belt 35 moves back and forth in the Y-axis direction.

When the conveyance motor 36 is driven and controlled, the medium supporting portion 31 where the sliding part 33R is fixed to the conveyance belt 35 also moves back and forth in the Y-axis direction. In addition, as a result, the medium supporting portion 31 moves back and forth in the Y-axis direction between the set position and the printing position where the medium support surface 32 is located at the printing region PA.

The ejecting portion moving mechanism 40 includes, in addition to the above-described carriage 15, a carriage supporting portion 41, a conveyance belt 42, a movement motor 43 and a pulley 44. The carriage supporting portion 41 includes a pair of sliding parts 45L and 45R provided with a distance therebetween in the X-axis direction. In addition, in the carriage 15, the liquid ejecting portion 10 is mounted in the state where the nozzle surface 11 is along the X-Y plane and ink can be ejected from the nozzle N in the +Z direction. The carriage 15 is attached to the conveyance belt 42. The conveyance belt 42 is wound between the movement motor 43 and the pulley 44.

In addition, the ejecting portion moving mechanism 40 includes a pair of guide shafts 46L and 46R that slidably guide the sliding parts 45L and 45R of the carriage supporting portion 41 in the Y-axis direction, a conveyance belt 47, a movement motor 48 and a pulley 49. The sliding part 45R of the carriage supporting portion 41 is attached to the conveyance belt 47. The conveyance belt 47 is wound between the movement motor 48 and the pulley 49.

When the movement motor 43 is driven and controlled, the conveyance belt 42 moves back and forth in the X-axis direction. When the movement motor 43 is driven and controlled, the carriage 15 attached to the conveyance belt 42 and the liquid ejecting portion 10 mounted to the carriage 15 also move back and forth in the X-axis direction. The X-axis direction is an example of a scanning direction. In this embodiment, the scanning direction is the +X direction and the −X direction.

When the movement motor 48 is driven and controlled, the conveyance belt 47 moves back and forth in the Y-axis direction. When the movement motor 48 is driven and controlled, the carriage supporting portion 41 where the sliding part 45R is attached to the conveyance belt 47 also moves back and forth in the Y-axis direction. When the movement motor 48 is driven and controlled, the carriage 15 attached to the carriage supporting portion 41 through the conveyance belt 42 and the liquid ejecting portion 10 mounted in the carriage 15 also move back and forth in the Y-axis direction.

Thus, when the movement motor 43 and the movement motor 48 are driven and controlled, the liquid ejecting portion 10 moves back and forth in the X-axis direction and the Y-axis direction. In addition, as a result, the liquid ejecting portion 10 is provided at the base portion 101 so as to be movable on the −Z direction side of the printing region PA, the region on the −X direction side of the printing region PA in the X-axis direction, the region on the +X direction side of the printing region PA in the X-axis direction, the region on the −Y direction side of the printing region PA in the Y-axis direction, and the region on the +Y direction side of the printing region PA in the Y-axis direction.

Figure 4:
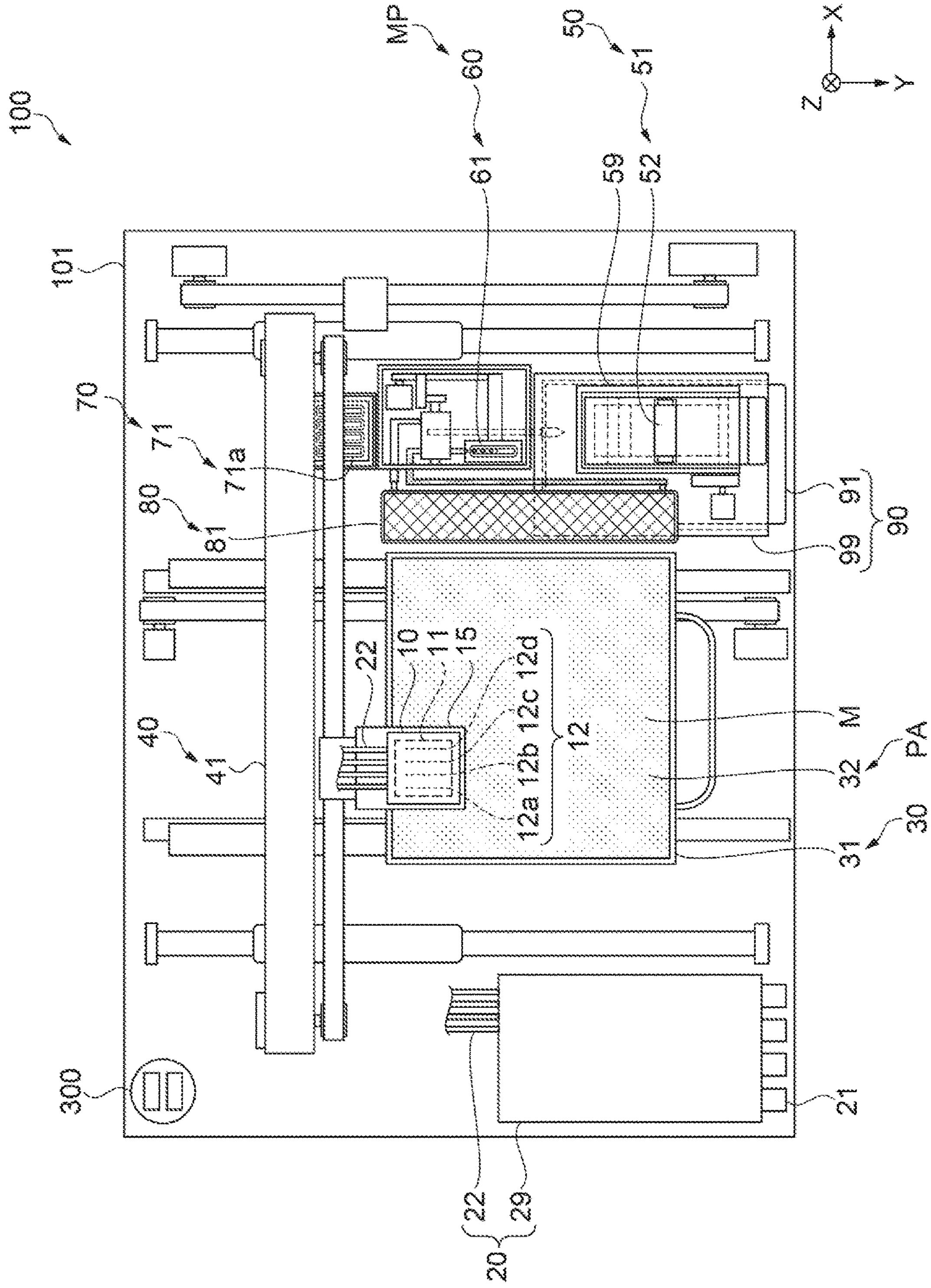
FIG. 4 is a schematic plan view illustrating the liquid ejecting device in a state where the liquid ejecting portion is located at a printing region.

When performing printing by ejecting ink to the printing medium M from the nozzle N, the liquid ejecting device 100 moves the liquid ejecting portion 10 to a position where any of the nozzles N making up the nozzle row 12 faces the printing medium M located at the printing region PA as illustrated in FIG. 4 by driving the ejecting portion moving mechanism 40 in the state where the medium supporting portion 31 that supports the printing medium M is located at the printing position. Then, the liquid ejecting device 100 performs printing by causing the liquid ejecting portion 10 to eject ink to the printing medium M from the nozzle N while repeating the back and forth movement of the liquid ejecting portion 10 in the X-axis direction and the movement of the liquid ejecting portion 10 in the +Y direction.

The maintenance portion MP performs the maintenance of the liquid ejecting portion 10. As illustrated in FIGS. 1 and 2, the maintenance portion MP is provided in the region on the +X direction side of the printing region PA in the X-axis direction in the base portion 101. The region on the +X direction side of the printing region PA in the X-axis direction is an example of one side of the outside of the printing region PA in the X-axis direction. The maintenance portion MP includes a wiping portion 50, a cleaning portion 60, a moisturizing portion 70, a liquid reception portion 80 and a waste liquid housing portion 90.

As illustrated in FIGS. 2 to 10, the wiping portion 50, the cleaning portion 60 and the moisturizing portion 70 are disposed side by side in the Y-axis direction. In this embodiment, the wiping portion 50, the cleaning portion 60 and the moisturizing portion 70 are disposed in the order of the moisturizing portion 70, the cleaning portion 60 and the wiping portion 50 from the −Y direction side toward the +Y direction side in the Y-axis direction.

Figure 8:
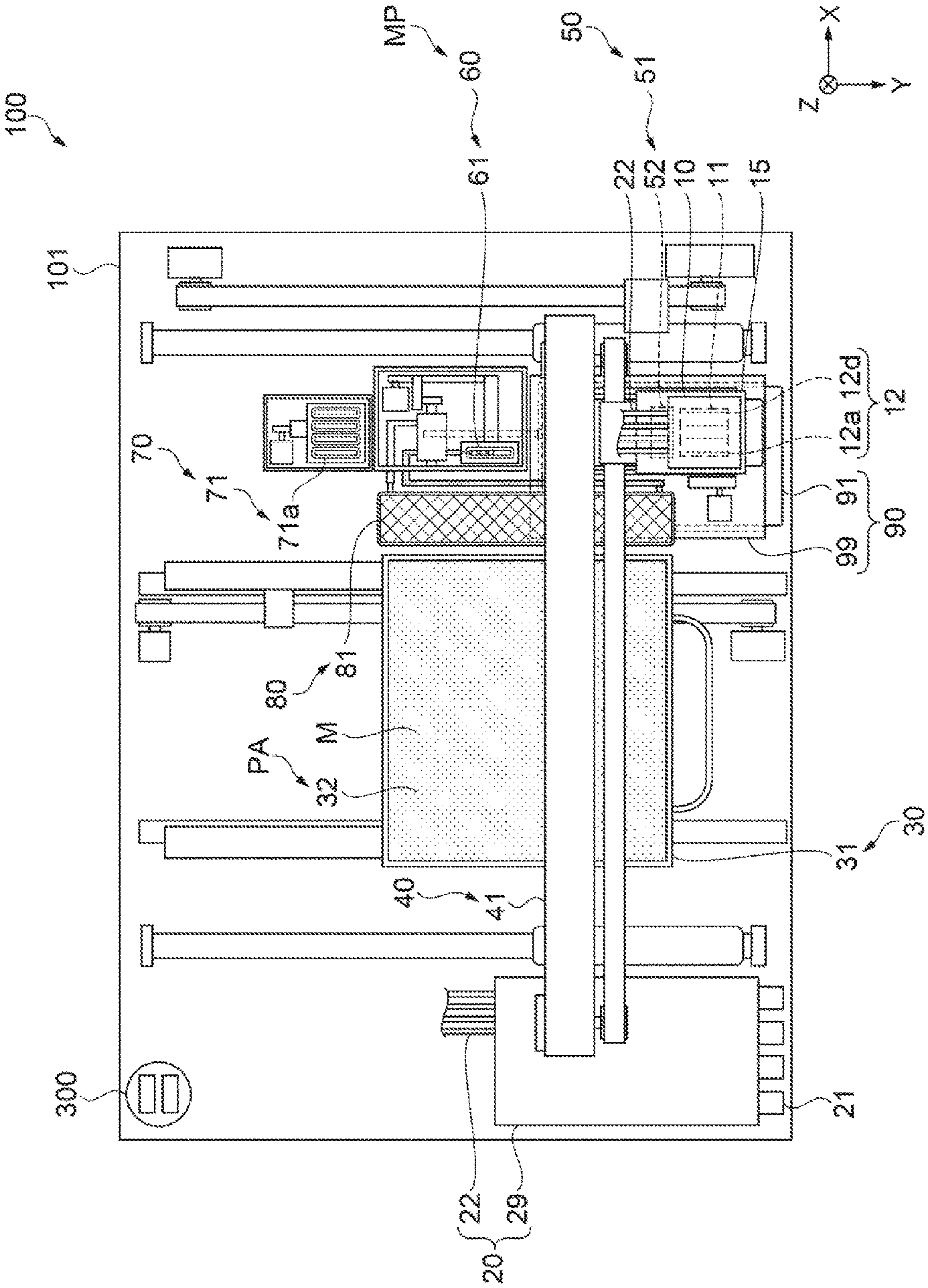
FIG. 8 is a schematic plan view illustrating the liquid ejecting device with the liquid ejecting portion located at a position after wiping.
Figure 9:
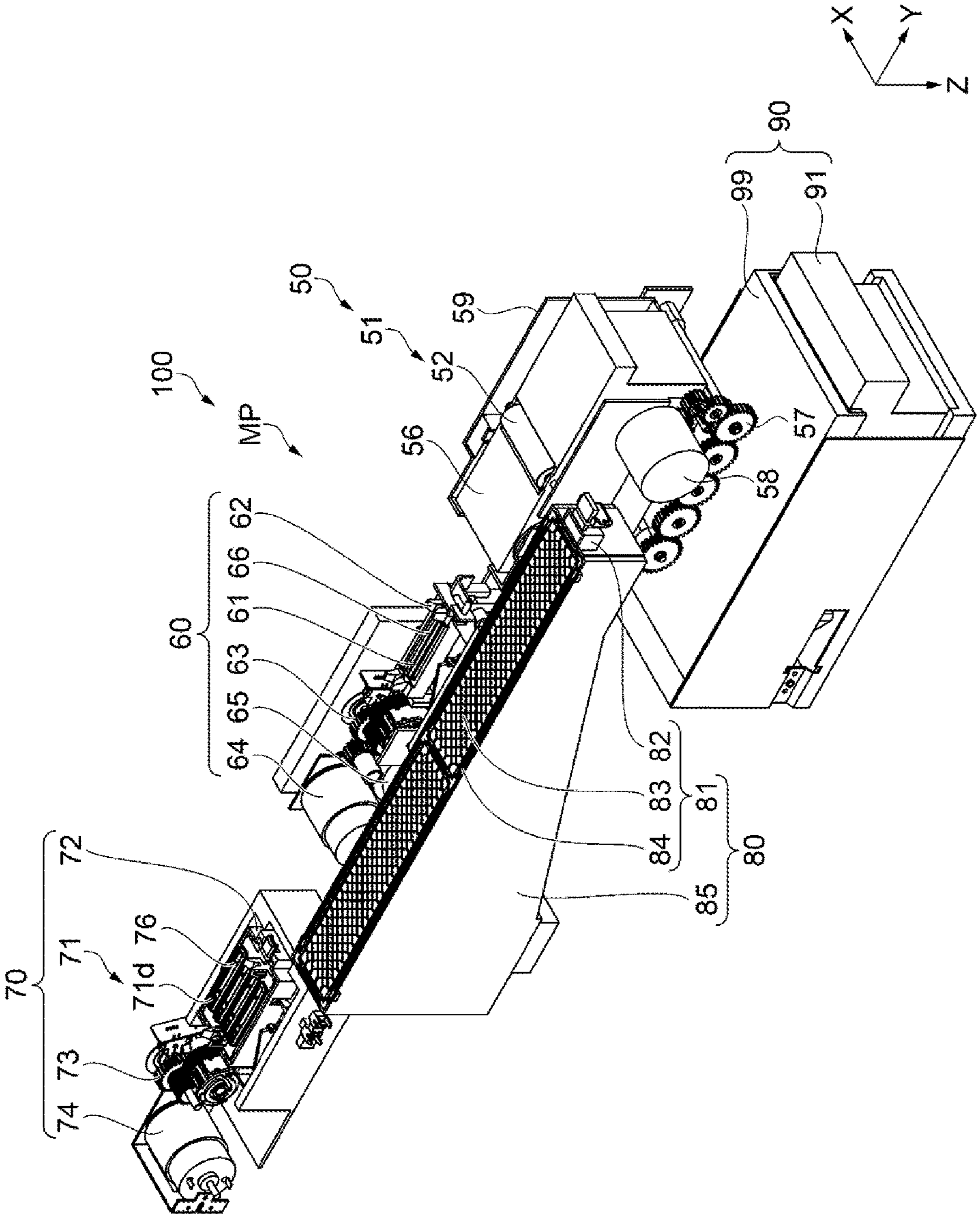
FIG. 9 is a perspective view illustrating a schematic configuration of a maintenance portion of an embodiment of the present disclosure.
Figure 10:
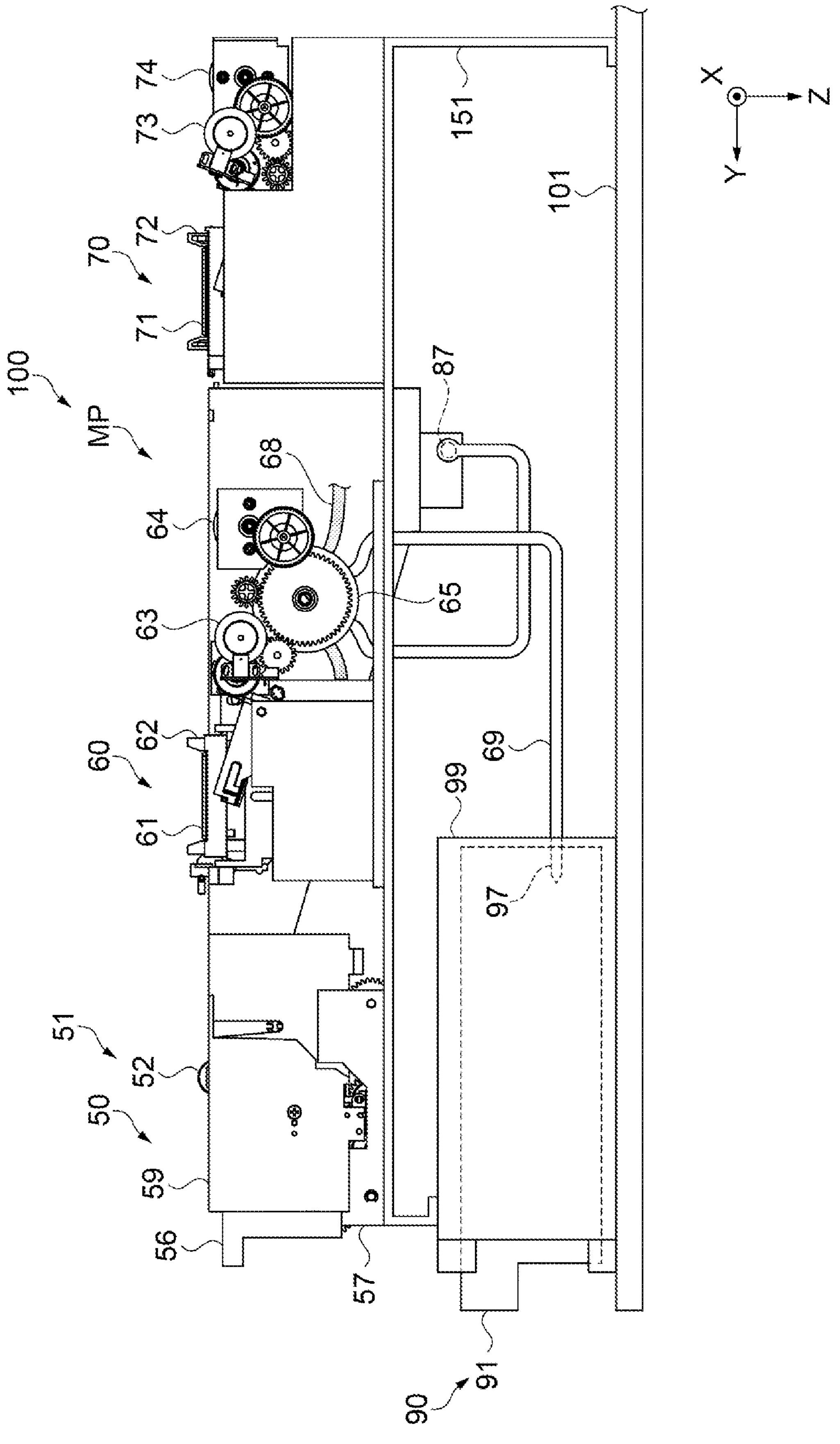
FIG. 10 is a side view illustrating a schematic configuration of a maintenance portion.

As illustrated in FIGS. 1 to 11, the waste liquid housing portion 90 includes a waste liquid container 91 and a waste liquid container mounting portion 99. The waste liquid container 91 can store ink discharged from the liquid ejecting portion 10 as waste liquid. As illustrated in FIG. 10, the waste liquid container mounting portion 99 is attached to the base portion 101. As illustrated in FIGS. 1 and 2, the waste liquid container mounting portion 99 is provided at a position on the +X direction side of the printing region PA in the X-axis direction and on the +Y direction side than the center of the base portion 101 in the Y-axis direction. The waste liquid container mounting portion 99 is provided such that the waste liquid container 91 can be attached and detached from the front surface 103 of the exterior member 102 on the +Y direction side in the Y-axis direction. In addition, the waste liquid container mounting portion 99 is provided at a position where at least a part of the waste liquid container mounting portion 99 overlaps a wiper 51 of the wiping portion 50 described later as viewed in the direction along the Z-axis direction. The waste liquid container mounting portion 99 is an example of a first mounting portion. The waste liquid container mounting portion 99 includes a discharge portion 97 that discharges ink as waste liquid to the waste liquid container 91 when connected to the mounted waste liquid container 91.

The liquid reception portion 80 receives ink ejected as waste liquid from the liquid ejecting portion 10. The liquid reception portion 80 of this embodiment is provided in the region on the +X direction side of the printing region PA in the X-axis direction in the base portion 101. Note that it suffices that the liquid reception portion 80 is provided at least one of the region on the +X direction side and the region on the −X direction side of the printing region PA in the X-axis direction in the base portion 101. For example, the liquid reception portion 80 may be provided in the region on the −X direction side of the printing region PA in the X-axis direction in the base portion 101. Alternatively, the liquid reception portion 80 may be provided in the region on the +X direction side and the −X direction side of the printing region PA in the X-axis direction in the base portion 101.

As illustrated in FIG. 2, the liquid reception portion 80 of this embodiment is provided at a position adjacent to the medium supporting portion 31 located at the printing position, on the +X direction side of the printing region PA in the X-axis direction. In addition, the liquid reception portion 80 is provided at a position between the printing region PA and the wiper 51, the cleaning portion 60 and the moisturizing portion 70 of the maintenance portion MP in the X-axis direction in the base portion 101.

In addition, at least a part of the liquid reception portion 80 is located on the −Z direction side of the waste liquid container mounting portion 99 in the waste liquid housing portion 90. In addition, as illustrated in FIG. 2, when the liquid reception portion 80 is viewed from the direction along the vertical direction as the Z-axis direction, at least a part of the liquid reception portion 80 is provided at a position overlapping the waste liquid container mounting portion 99 in the waste liquid housing portion 90.

As illustrated in FIGS. 2, 9, 11 and 12, the liquid reception portion 80 includes a liquid reception portion 81 and a liquid reception case 85. The liquid reception portion 81 is detachably provided on the −Z direction side of the liquid reception case 85. The liquid reception portion 81 includes a holding member 82, a liquid reception member 83 and a holding member 84.

The holding member 82 includes a through hole extending through the Z-axis direction, and holds the liquid reception member 83 in such a manner as to cover the opening of the through hole on the −Z direction side. The liquid reception member 83 is formed of an absorbent material that can hold ink and allows the ink to pass in the +Z direction. The liquid reception member 83 is formed of a non-woven fabric that can absorb ink, for example. The holding member 84 is provided on the −Z direction side of the liquid reception member 83, and fixes the liquid reception member 83 to the holding member 82.

The holding member 84 is provided with a plurality of through holes such that the liquid reception member 83 can receive the ink ejected from the liquid ejecting portion 10. In this manner, the end on the −Y direction side of the region where the liquid reception portion 80 can receive the ink ejected from the liquid ejecting portion 10 is located on the −Y direction side than the printing region PA. In addition, the end on the +Y direction side of the region where the liquid reception portion 80 can receive the ink ejected from the liquid ejecting portion 10 is located on the +Y direction side than the printing region PA. In other words, the liquid reception portion 80 is provided over the Y-axis direction of the printing region PA in the Y-axis direction.

Note that the dimension in the X-axis direction of the range where the liquid reception portion 80 can receive the ink ejected from the liquid ejecting portion 10 is desirably greater than the dimension between the nozzle row 12*a* and the nozzle row 12*d* in the X-axis direction as illustrated in FIG. 2, but may be smaller than the dimension between the nozzle row 12*a* and the nozzle row 12*d* in the X-axis direction.

Figure 12:
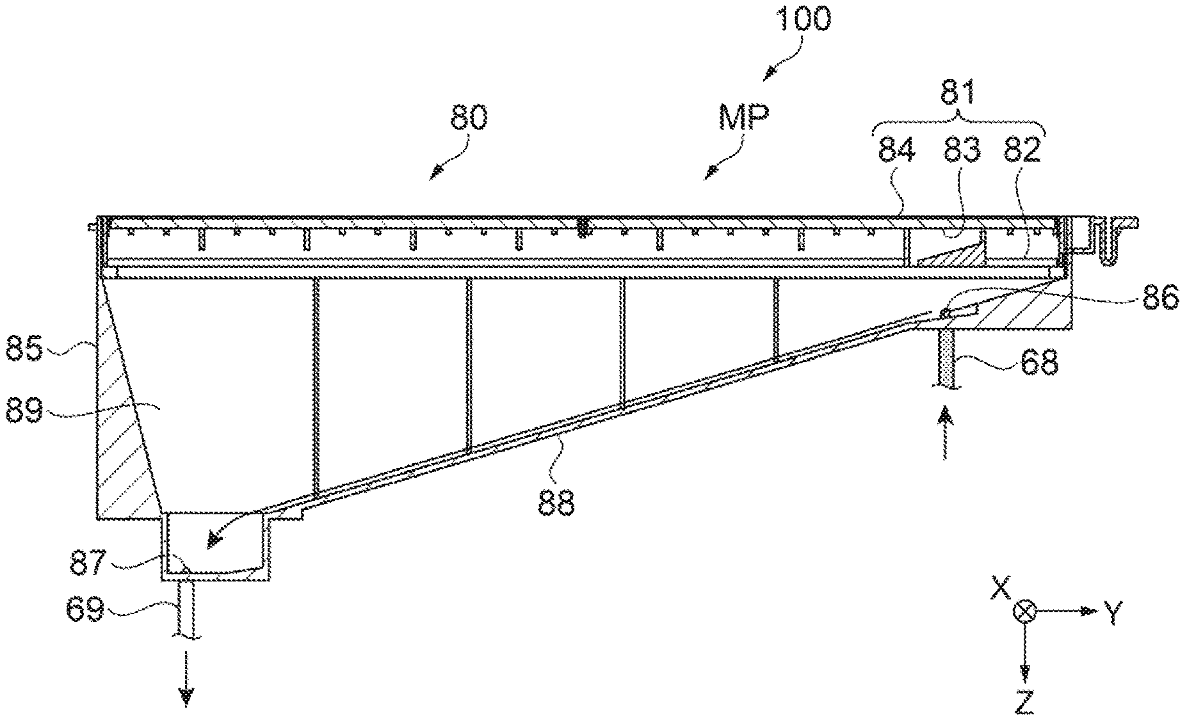
FIG. 12 is a sectional view illustrating a schematic configuration of a waste liquid reception portion of an embodiment of the present disclosure.

As illustrated in FIG. 12, the liquid reception case 85 is provided with a liquid reception chamber 89 that can receive the ink ejected from the liquid ejecting portion 10. The liquid reception chamber 89 is provided with an inflow portion 86 where ink flows into the liquid reception chamber 89 through a first waste liquid tube 68 described later, and an outflow portion 87 where ink flows out from the liquid reception chamber 89 through a second waste liquid tube 69 described later. The inflow portion 86 is provided on the +Y direction side in the liquid reception chamber 89, on the +Y direction side than the outflow portion 87 in the Y-axis direction. The outflow portion 87 is provided at the inner bottom, which is the end on the +Z direction side in the liquid reception chamber 89, on the +Z direction side than the inflow portion 86 in the Z-axis direction.

In the liquid reception case 85, a bottom wall 88 is provided at a region between the inner bottom of the liquid reception chamber 89 and the inflow portion 86 in the Y-axis direction. The bottom wall 88 defines a part of the exterior part of the liquid reception case 85 and a part of the bottom surface of the liquid reception chamber 89. The bottom wall 88 is tilted to the +Z direction toward the −Y direction side as the inner bottom side from the +Y direction side as the inflow portion 86 side in the Y-axis direction. In addition, the bottom wall 88 is located on the +Z direction side than the inflow portion 86, and located on the −Z direction side than the outflow portion 87.

In other words, the bottom surface of the liquid reception portion 80 includes the bottom wall 88 tilted downward toward the −Y direction side from the +Y direction side in the Y-axis direction. In addition, at least a part of the bottom wall 88 is located on the −Z direction side of the waste liquid container mounting portion 99 in the waste liquid housing portion 90. In addition, when the liquid reception portion 80 is viewed from the direction along the Z-axis direction in FIGS. 2 and 11, at least a part of the bottom wall 88 is provided at a position overlapping the waste liquid container mounting portion 99 in the waste liquid housing portion 90. The bottom wall 88 is an example of an inclined part.

Figure 5:
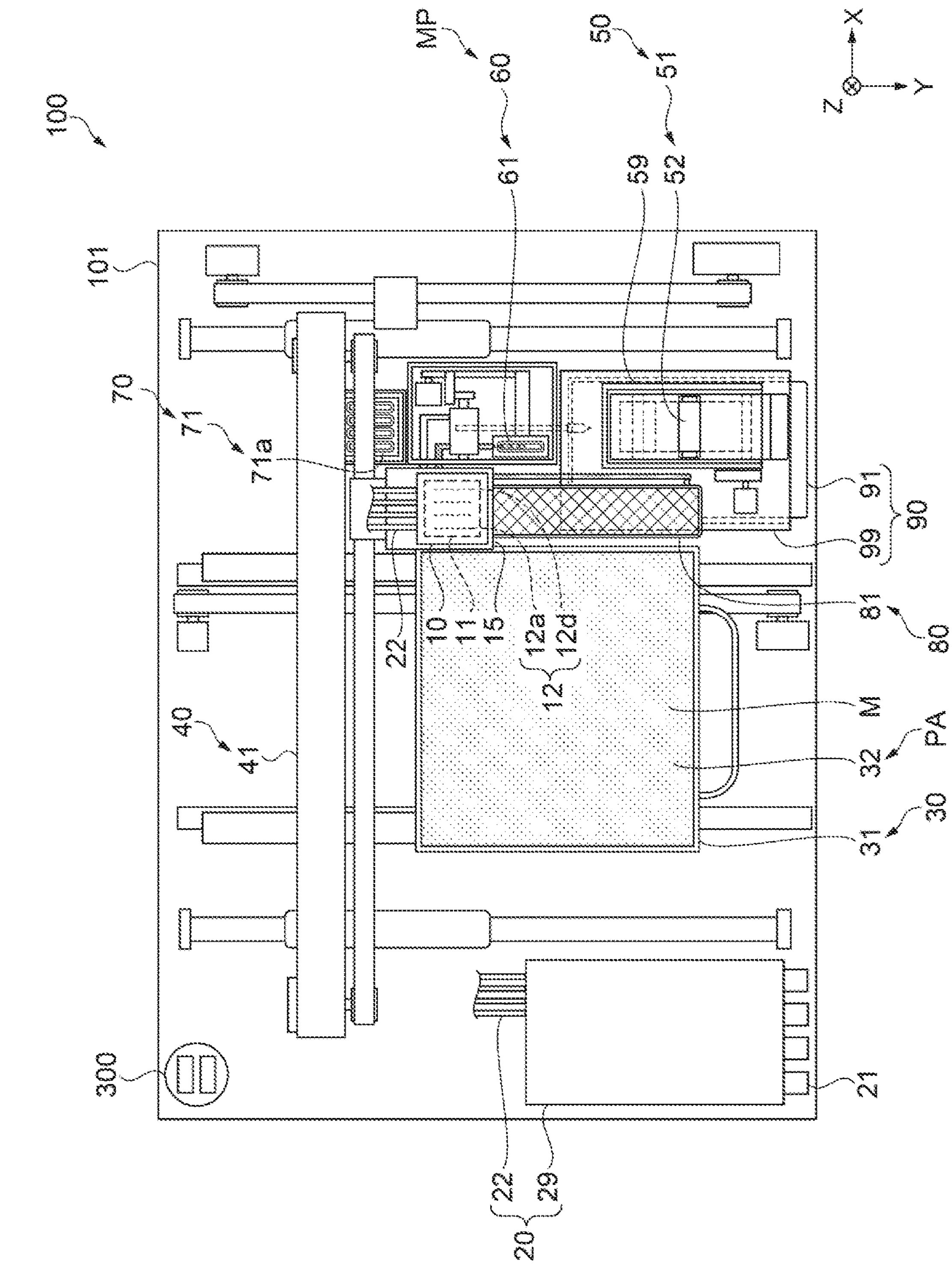
FIG. 5 is a schematic plan view illustrating the liquid ejecting device in a state where the liquid ejecting portion faces a liquid reception portion.

When performing flushing of ejecting ink as waste liquid from the nozzle N of the liquid ejecting portion 10 toward the liquid reception portion 81 of the liquid reception portion 80, the liquid ejecting device 100 moves the liquid ejecting portion 10 to a position where any of the nozzle rows 12*a*, 12*b*, 12*c* and 12*d* for performing the flushing faces the liquid reception portion 81, by driving the ejecting portion moving mechanism 40. In FIG. 5, the nozzle rows 12*a*, 12*b*, 12*c* and 12*d* face the liquid reception portion 81. Then, the liquid ejecting device 100 performs the flushing by ejecting the ink from the nozzle N of the liquid ejecting portion 10.

The wiping portion 50 is provided at the base portion 101 so as to be able to wipe the nozzle surface 11 where the nozzle N of the liquid ejecting portion 10 is provided. As illustrated in FIGS. 2, 9 and 10, the wiping portion 50 includes the wiper 51, a wiper mounting portion 59, a wiping portion driving mechanism 57 and a wiping portion motor 58. The wiping portion 50 is fixed to the base portion 101 through a maintenance frame 151. The wiping portion 50 is provided on the −Z direction side of the waste liquid housing portion 90.

The wiper mounting portion 59 is provided on the +X direction side of the liquid reception portion 80 in the X-axis direction. The wiper mounting portion 59 is provided at a position on the +Y direction side than the center of the base portion 101 in the Y-axis direction. The wiper mounting portion 59 is provided such that the wiper 51 can be attached and detached from the front surface 103 of the exterior member 102 on the +Y direction side in the Y-axis direction.

Figure 13:
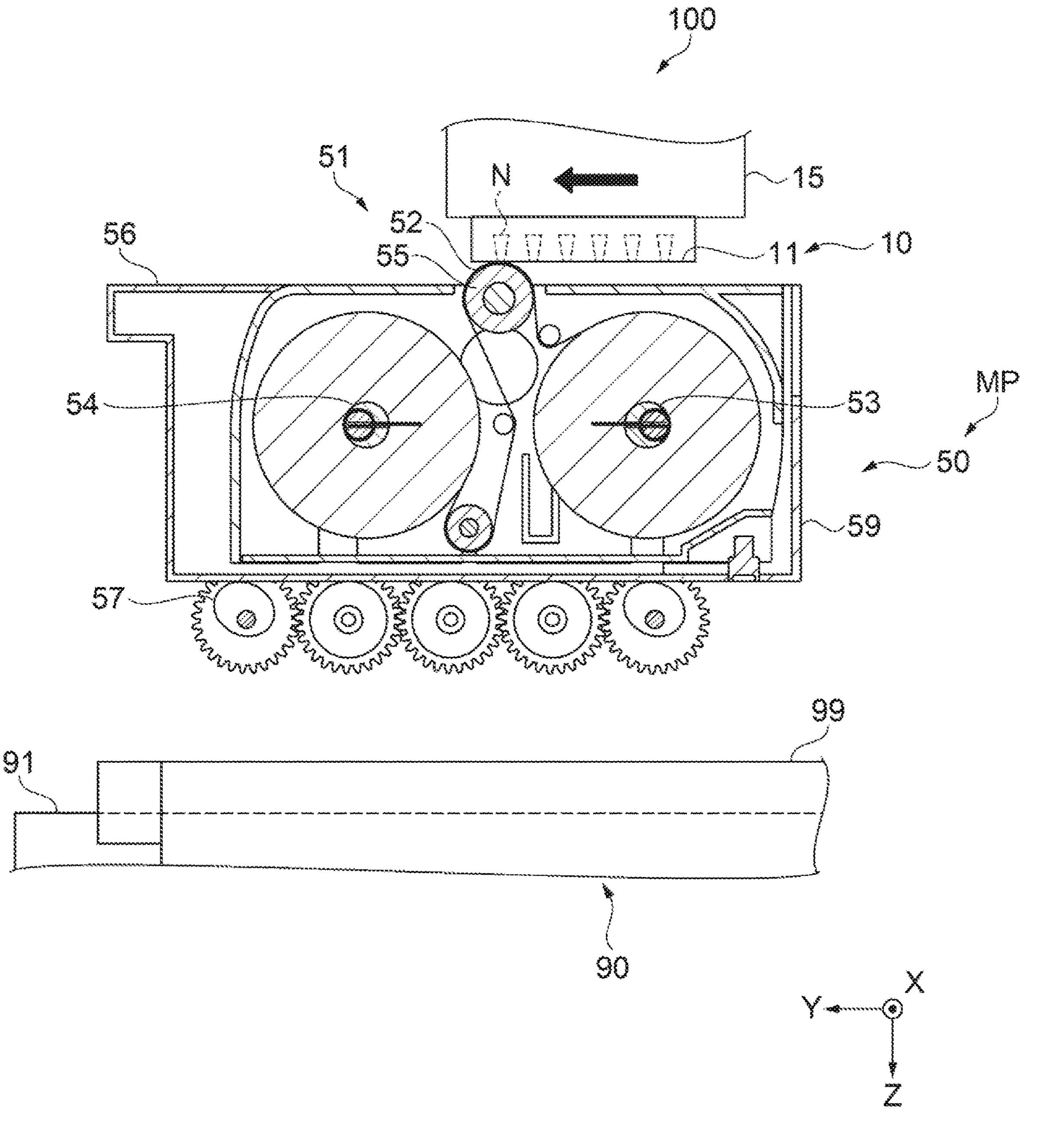
FIG. 13 is a sectional view illustrating a state where a wiper of an embodiment of the present disclosure is located at a wipeable position.
Figure 14:
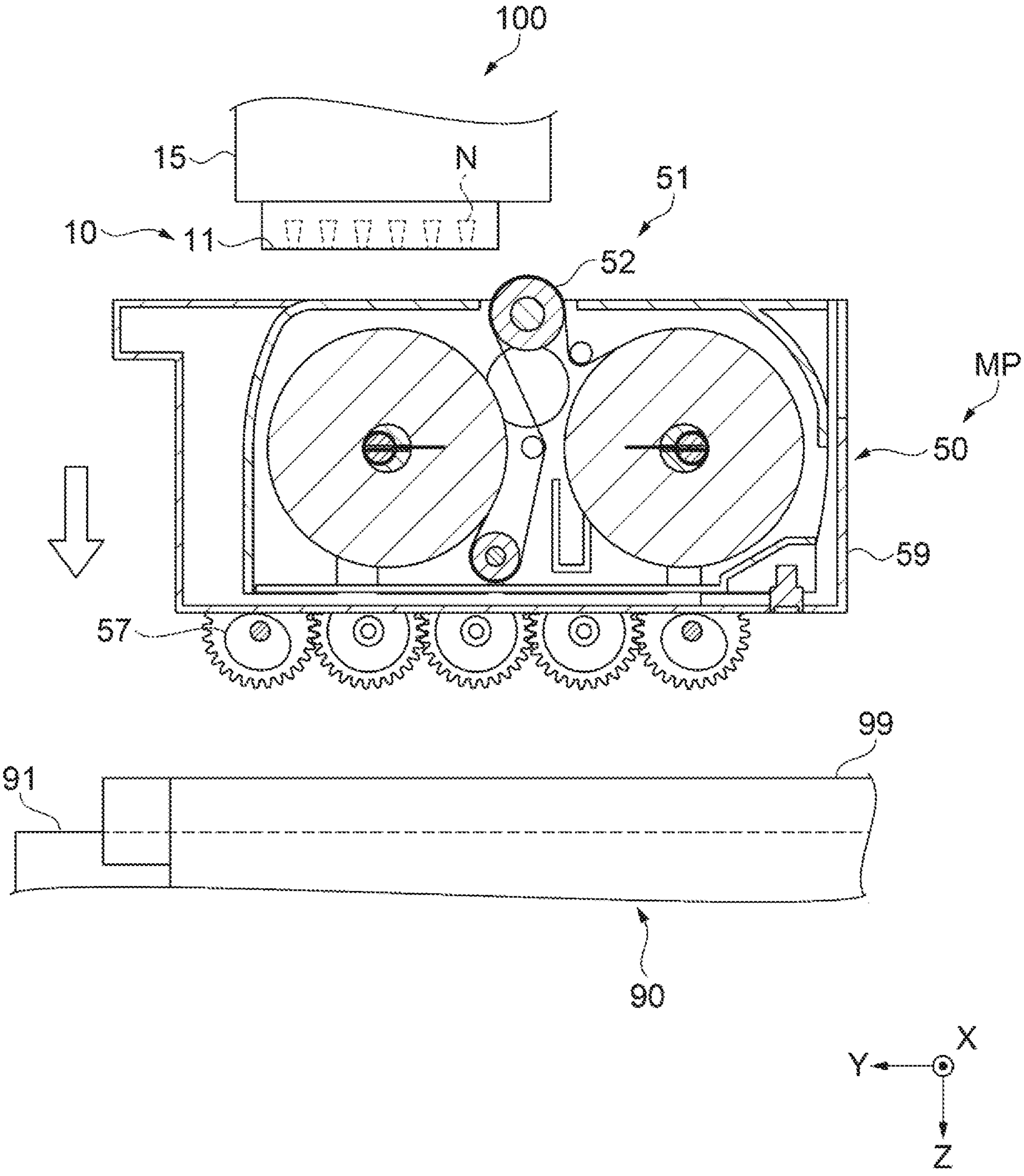
FIG. 14 is a sectional view illustrating a state where the wiper is located at a separated position.

As illustrated in FIGS. 13 and 14, the wiper 51 is composed of a belt-shaped member 52, an unwinding shaft 53, a winding shaft 54, a pressing member 55 and a case 56. The unwinding shaft 53, the winding shaft 54 and the pressing member 55 are rotatably provided at the case 56. The winding shaft 54 is provided on the +Y direction side than the unwinding shaft 53. The pressing member 55 is located between the unwinding shaft 53 and the winding shaft 54 in the Y-axis direction, and located on the −Z direction side than the unwinding shaft 53 and the winding shaft 54 in the Z-axis direction.

Figure 7:
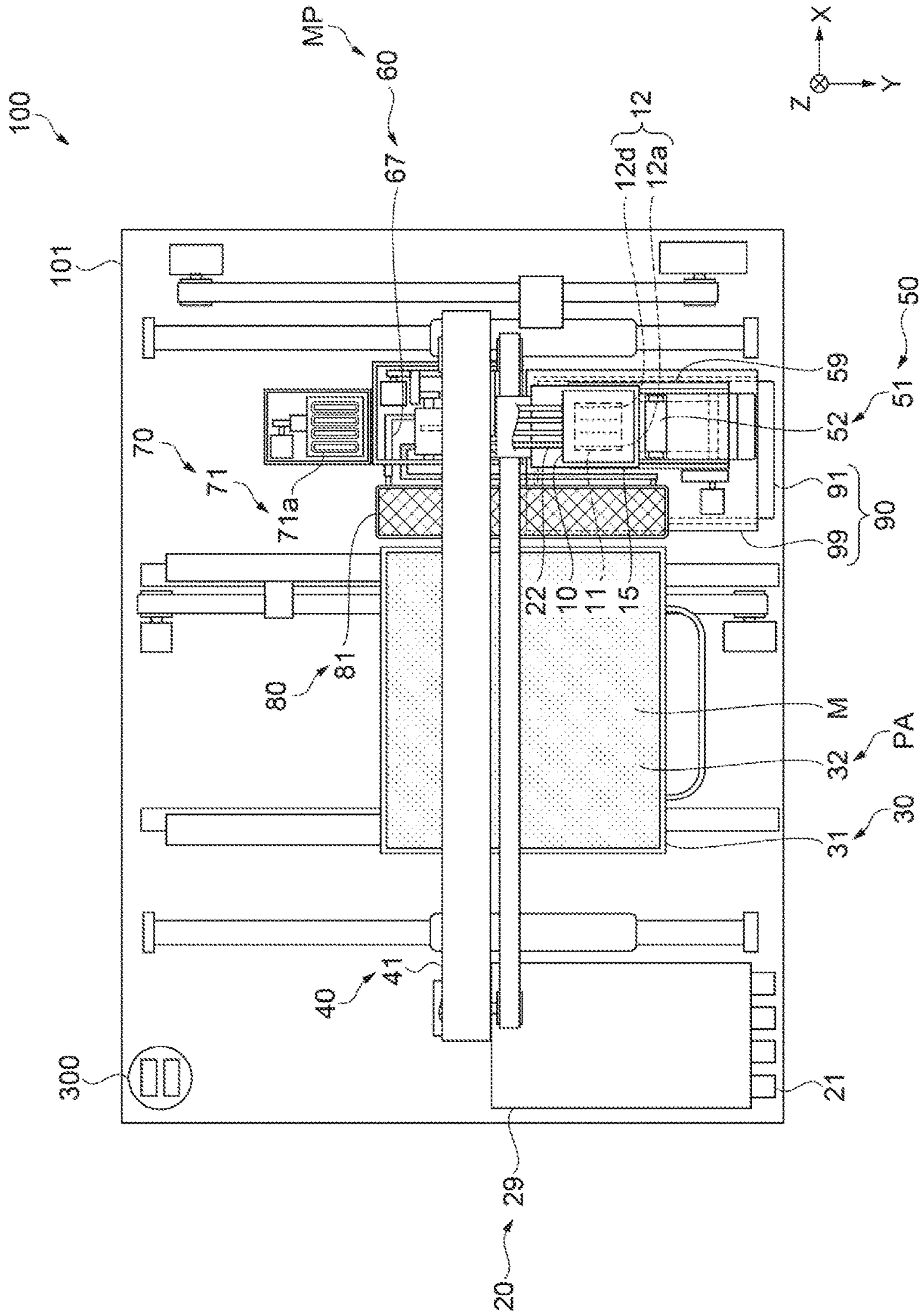
FIG. 7 is a schematic plan view illustrating the liquid ejecting device with the liquid ejecting portion located at a position before wiping.

The belt-shaped member 52 is formed of a sheet-shaped absorption member that can absorb liquid. The dimension of the belt-shaped member 52 in the X-axis direction is desirably greater than the dimension of the nozzle surface 11 in the X-axis direction as illustrated in FIGS. 7 and 8, but may be smaller than the dimension of the nozzle surface 11 in the X-axis direction. As illustrated in FIGS. 13 and 14, when the belt-shaped member 52 is being unwound from the unwinding shaft 53 and wound around the winding shaft 54, the belt-shaped member 52 is housed in the case 56 such that it is pushed in the −Z direction by the pressing member 55. In this embodiment, the liquid ejecting portion 10 moves in the Y-axis direction with respect to the wiping portion 50 with the belt-shaped member 52 in contact with the nozzle surface 11 of the liquid ejecting portion 10, and thus the nozzle surface 11 is wiped.

When the wiping portion motor 58 is driven and controlled, the wiping portion driving mechanism 57 moves the wiper mounting portion 59 and the wiper 51 mounted to the wiper mounting portion 59 to a wipeable position and a separated position. The wipeable position is a position where the belt-shaped member 52 exposed from the case 56 in the −Z direction can make contact with the nozzle surface 11 as illustrated in FIG. 13, and the separated position is a position where the belt-shaped member 52 illustrated in FIG. 14 does not make contact with the nozzle surface 11. In addition, when the wiping portion motor 58 is driven and controlled, the wiping portion driving mechanism 57 winds, around the winding shaft 54, the belt-shaped member 52 unwound from the unwinding shaft 53 and used for wiping of the nozzle surface 11.

When wiping the nozzle surface 11 with the wiping portion 50, the liquid ejecting device 100 moves the wiper 51 to the wipeable position by driving the wiping portion driving mechanism 57. Then, the liquid ejecting device 100 moves the liquid ejecting portion 10 to a position on the −Y direction side of the belt-shaped member 52 by driving the ejecting portion moving mechanism 40 as illustrated in FIG. 7. Further, the liquid ejecting device 100 brings the nozzle surface 11 into contact with the belt-shaped member 52 located at the wipeable position by moving the liquid ejecting portion 10 in the +Y direction as illustrated in FIG. 13. Further, the liquid ejecting device 100 wipes the nozzle surface 11 with the wiping portion 50 by moving the liquid ejecting portion 10 in the +Y direction as illustrated with the arrow in FIG. 13.

Further, as illustrated in FIG. 8, the liquid ejecting device 100 moves the nozzle surface 11 of the liquid ejecting portion 10 to a wiping end position, which is the +Y direction side of the belt-shaped member 52, and terminates the wiping of the nozzle surface 11. After the nozzle surface 11 is wiped, it is assumed that the liquid ejecting portion 10 is moved in the −Y direction from the wiping end position illustrated in FIG. 8 toward the standby position illustrated in FIG. 3, for example. In this case, the liquid ejecting device 100 moves the wiper 51 mounted to the wiper mounting portion 59 and the wiper mounting portion 59 from the wipeable position toward the separated position as indicated by the white arrow in FIG. 14 by driving the wiping portion driving mechanism 57. Then, by driving the ejecting portion moving mechanism 40, the liquid ejecting device 100 moves the liquid ejecting portion 10 in the −Y direction so as to pass it through the −Z direction side, which is the vertically upper side of the wiping portion 50.

The cleaning portion 60 is provided at the base portion 101 such that cleaning by forcibly discharging ink from the nozzle N of the liquid ejecting portion 10 can be executed. As illustrated in FIGS. 2, 9 and 10, the cleaning portion 60 includes a suctioning cap 61, a suctioning cap holding part 62, a cleaning portion driving mechanism 63, a cleaning portion motor 64 and a suction pump 65. The suction pump 65 is an example of a suction portion. The cleaning portion 60 is fixed to the base portion 101 through the maintenance frame 151.

Figure 6:
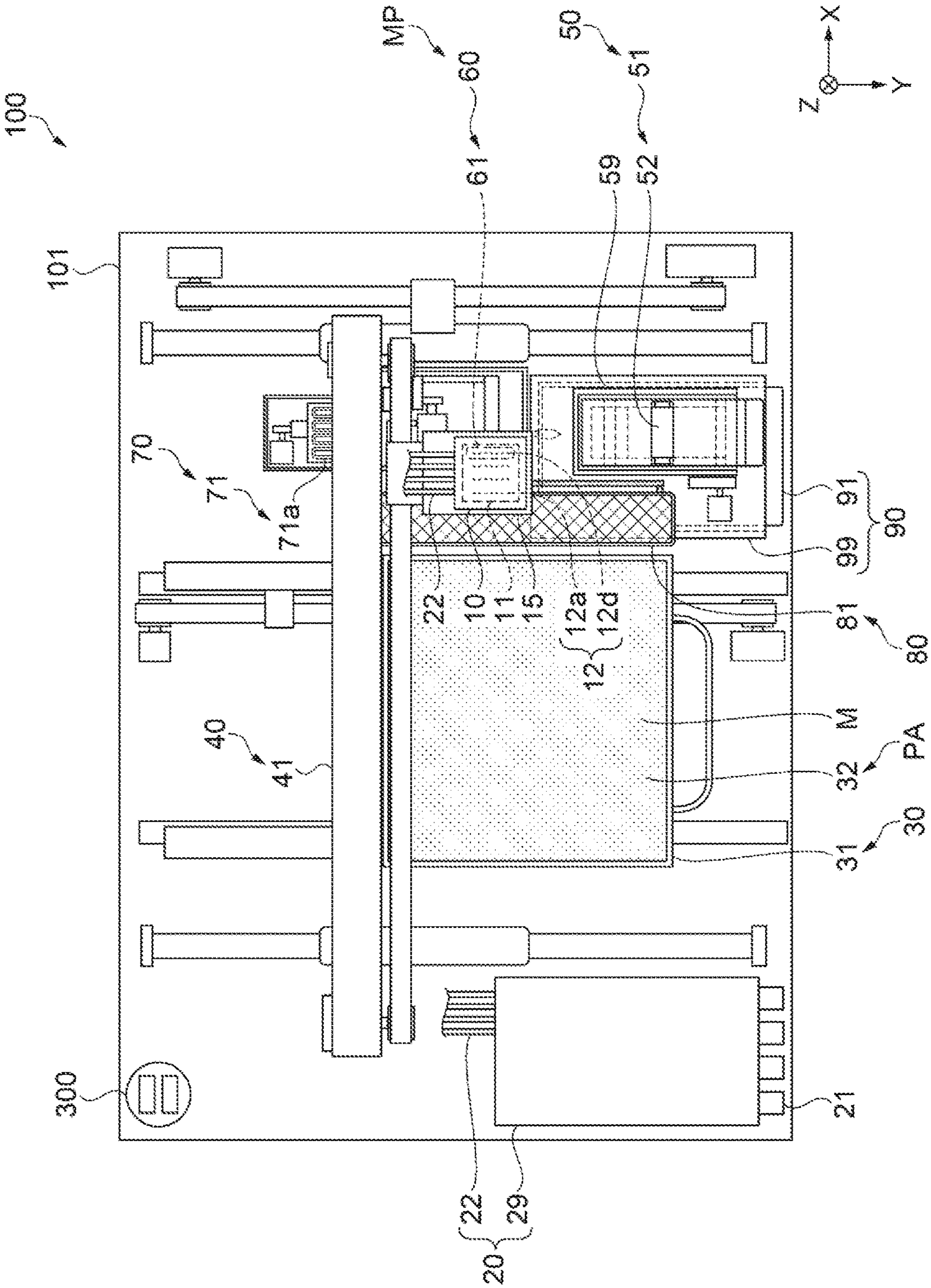
FIG. 6 is a schematic plan view illustrating the liquid ejecting device in a state where the liquid ejecting portion faces a cleaning portion.
Figure 11:
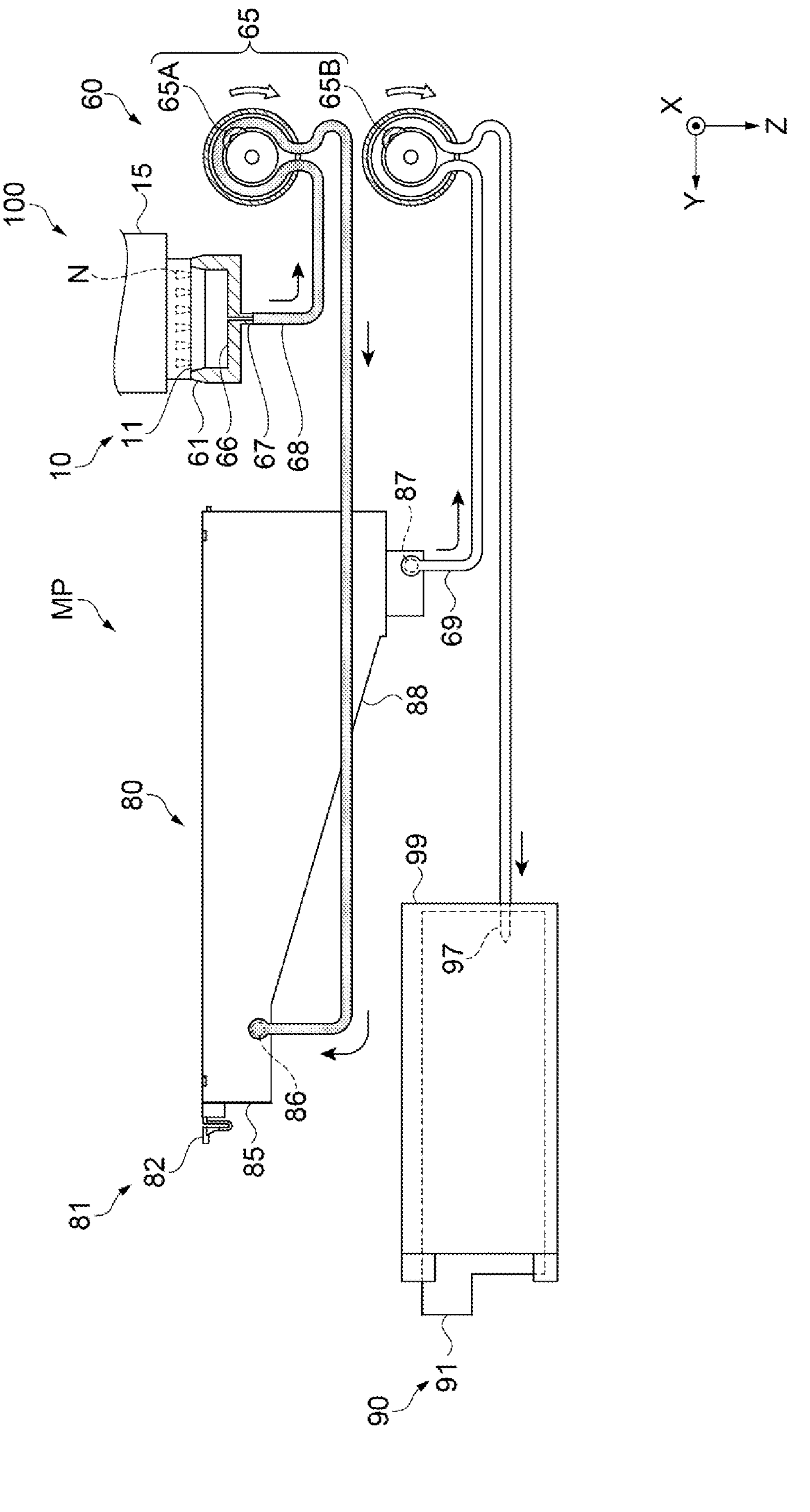
FIG. 11 is a schematic view illustrating liquid flow in cleaning with the cleaning portion.

As illustrated in FIG. 6, the suctioning cap 61 is provided in the region on the +X direction side with respect to the printing region PA such that the nozzle surface 11 does not face the printing region PA when the nozzle row 12*d* located on the most +X direction side in the nozzle row 12 of the liquid ejecting portion 10 and the suctioning cap 61 are located at positions facing each other. As a result, the dimension between the suctioning cap 61 and the printing region PA in the X-axis direction is greater than the dimension of the nozzle surface 11 in the X-axis direction. As illustrated in FIGS. 9 and 11, the suctioning cap 61 includes a recess 66 that can form a closed space to which a plurality of nozzles N open, by making contact with the nozzle surface 11 of the liquid ejecting portion 10. As illustrated in FIGS. 2, 9 and 10, the suctioning cap 61 is held by the suctioning cap holding part 62.

As illustrated in FIGS. 2 and 10 to 12, the suctioning cap 61 is communicated with the waste liquid container 91 that contains ink as waste liquid through the first waste liquid tube 68, the liquid reception portion 80 and the second waste liquid tube 69. The first waste liquid tube 68 connects a discharge portion 67 of the suctioning cap 61 with the inflow portion 86 of the liquid reception portion 80. The second waste liquid tube 69 connects the outflow portion 87 of the liquid reception portion 80 and the discharge portion 97 of the waste liquid container mounting portion 99. The first waste liquid tube 68 is an example of a first waste liquid channel, and the second waste liquid tube 69 is an example of a second waste liquid channel.

The cleaning portion driving mechanism 63 moves the suctioning cap holding part 62 in the Z-axis direction by driving and controlling the cleaning portion motor 64. When the suctioning cap holding part 62 moves in the Z-axis direction, the suctioning cap 61 moves in the Z-axis direction between a non-capping position where it does not make contact with the nozzle surface 11 and a suction-enabled position where it makes contact with the nozzle surface 11. In addition, the cleaning portion driving mechanism 63 causes the suction pump 65 to perform a suction operation by driving and controlling the cleaning portion motor 64.

The suction pump 65 of this embodiment is a tube pump in which a roller rotates around the axis while crushing the first waste liquid tube 68 and the second waste liquid tube 69, and includes a first suction portion 65A and a second suction portion 65B. The first suction portion 65A is provided at the first waste liquid tube 68 such that the closed space formed by the suctioning cap 61 can be suctioned. The second suction portion 65B is provided at the second waste liquid tube 69 such that the interior of the liquid reception chamber 89 of the liquid reception portion 80 can be suctioned. Note that the first suction portion 65A and the second suction portion 65B are disposed side by side in the X-axis direction, while FIG. 11 conceptually illustrates the configuration of the cleaning portion 60 for the sake of illustrating the ink flow from the suctioning cap 61 to the waste liquid container 91.

When performing cleaning with the cleaning portion 60, the liquid ejecting device 100 moves the liquid ejecting portion 10 to a position where any of the nozzle rows 12*a*, 12*b*, 12*c* and 12*d* faces the suctioning cap 61 by driving the ejecting portion moving mechanism 40 with the suctioning cap 61 located at the non-capping position. In FIG. 6, the liquid ejecting portion 10 is located at a position where the nozzle row 12*d* faces the suctioning cap 61.

Then, when the cleaning portion driving mechanism 63 is driven, the suctioning cap 61 moves from the non-capping position to the suction-enabled position as illustrated in FIG. 11, and the closed space to which the plurality of nozzles N making up the nozzle row 12*d* open is formed. Further, when the cleaning portion driving mechanism 63 is driven, the first suction portion 65A and the second suction portion 65B of the suction pump 65 rotate as indicated with the white arrow, and the suction pump 65 performs the suction operation.

When the suction pump 65 performs the suction operation, the first suction portion 65A suctions the closed space, and ink is discharged to the closed space from the plurality of nozzles N making up the nozzle row 12*d*. The ink discharged to the closed space flows into the liquid reception chamber 89 of the liquid reception portion 80 through the first waste liquid tube 68 and the inflow portion 86 of the liquid reception portion 80 as indicated with the arrow in FIGS. 11 and 12. The ink entered the liquid reception chamber 89 flows toward the inner bottom of the liquid reception chamber 89 along the inclined bottom surface of the liquid reception chamber 89 defined by the bottom wall 88 as indicated with the arrow in FIG. 12. At this time, the ink ejected from the liquid ejecting portion 10 as waste liquid and attached to the inclined bottom surface of the liquid reception chamber 89 through the liquid reception portion 81 also flows toward the inner bottom of the liquid reception chamber 89 together with the ink entering from the inflow portion 86.

In addition, when the suction pump 65 performs the suction operation, the second suction portion 65B suctions the interior of the liquid reception chamber 89, and the ink inside the liquid reception chamber 89 flows into the waste liquid container 91 through the inner bottom of the liquid reception chamber 89, the outflow portion 87, the second waste liquid tube 69, and the discharge portion 97 of the waste liquid container mounting portion 99 as indicated with the arrow in FIGS. 11 and 12, so as to be contained as waste liquid.

The moisturizing portion 70 is provided at the base portion 101 such that the closed space to which the nozzle N of the liquid ejecting portion 10 opens can be formed. As illustrated in FIGS. 2, 9 and 10, the moisturizing portion 70 includes a moisturizing cap 71, a moisturizing cap holding part 72, a moisturizing cap lifting mechanism 73 and a moisturizing portion motor 74. The moisturizing portion 70 is fixed to the base portion 101 through the maintenance frame 151. The moisturizing portion 70 is provided on the −Y direction side than the printing region PA in the Y-axis direction.

The moisturizing cap 71 in this embodiment includes a moisturizing cap 71*a* corresponding to the nozzle row 12*a*, a moisturizing cap 71*b* corresponding to the nozzle row 12*b*, a moisturizing cap 71*c* corresponding to the nozzle row 12*c*, and a moisturizing cap 71*d* corresponding to the nozzle row 12*d*. As illustrated in FIG. 9, each of the moisturizing caps 71*a*, 71*b*, 71*c* and 71*d* includes a recess 76 that can form a closed space to which a plurality of nozzles N open by making contact with the nozzle surface 11 of the liquid ejecting portion 10.

The moisturizing cap holding part 72 holds the moisturizing caps 71*a*, 71*b*, 71*c* and 71*d*. The moisturizing cap lifting mechanism 73 moves the moisturizing cap holding part 72 in the Z-axis direction by controlling and driving and the moisturizing portion motor 74. When the moisturizing cap holding part 72 moves in the Z-axis direction, the moisturizing cap 71 moves in the Z-axis direction between the non-capping position where it does not make contact with the nozzle surface 11 and the capping position where it makes contact with the nozzle surface 11.

The moisturizing caps 71*a*, 71*b*, 71*c* and 71*d* located at the capping position form the closed space to which the nozzles N making up the corresponding nozzle rows 12*a*, 12*b*, 12*c* and 12*d* open, by making contact with the nozzle surface 11 of the liquid ejecting portion 10. The capping in which the moisturizing cap 71 forms the closed space to which the nozzle N opens in this manner is referred to as standby capping. The standby capping can suppress the evaporation of the moisture from the ink in the liquid ejecting portion 10 through the nozzle N.

The moisturizing caps 71*a*, 71*b*, 71*c* and 71*d* are provided on the −Y direction side than the printing region PA in the Y-axis direction. Note that the moisturizing cap 71 may be configured to collectively surround and cap all nozzles N making up the nozzle rows 12*a*, 12*b*, 12*c* and 12*d*.

Figure 3:
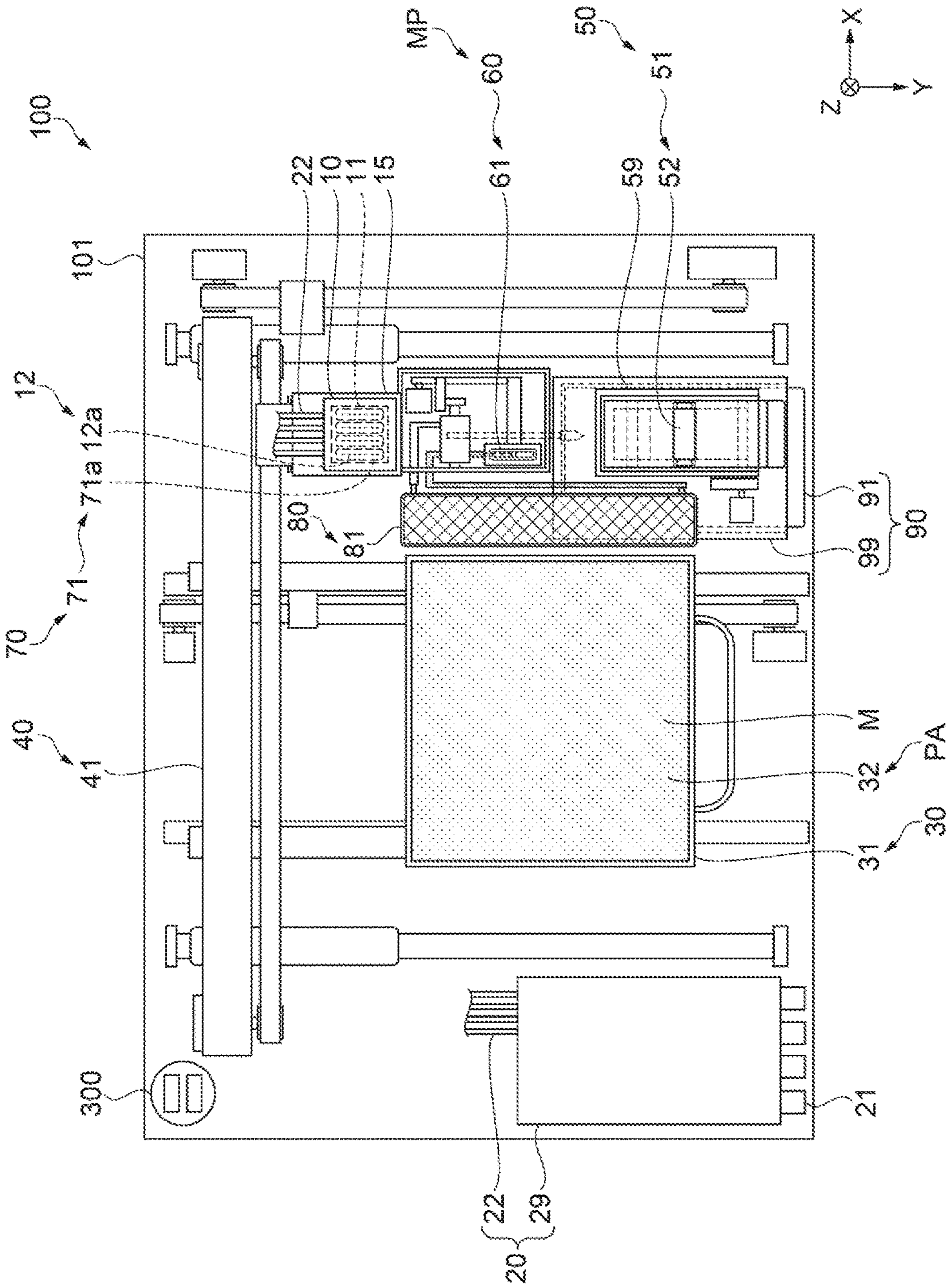
FIG. 3 is a schematic plan view illustrating the liquid ejecting device in a state where a liquid ejecting portion is located at a standby position.

During the non-printing state when the printing operation with the liquid ejecting portion 10 is not performed, the liquid ejecting device 100 performs the standby capping with the moisturizing portion 70. In this case, the liquid ejecting device 100 moves the liquid ejecting portion 10 to a position where the nozzle rows 12*a*, 12*b*, 12*c* and 12*d* face the moisturizing caps 71*a*, 71*b*, 71*c* and 71*d* as illustrated in FIG. 3 by driving the ejecting portion moving mechanism 40 with the moisturizing cap 71 located at the non-capping position.

Then, when the moisturizing cap lifting mechanism 73 is driven, the moisturizing cap 71 moves from the non-capping position to the capping position, and four closed spaces to which the plurality of nozzles N making up each the nozzle rows 12*a*, 12*b*, 12*c* and 12*d* open are formed. The standby position of the carriage 15 and the liquid ejecting portion 10 during the non-printing state is a position for performing the standby capping. In other words, during the non-printing state, the carriage 15 and the liquid ejecting portion 10 move to the standby position where the moisturizing cap 71 of the moisturizing portion 70 can form the closed space to which the nozzle N opens.

As illustrated in FIG. 2, the control portion 300 includes a central processing portion (CPU) 310 and a storage portion 320. The CPU 310 can execute various programs stored in the storage portion 320, make various determinations and issue various commands, and the like. The storage portion 320 stores various tables and various programs such as a program for the maintenance of the liquid ejecting portion 10, for example. The control portion 300 controls the entire liquid ejecting device 100.

For example, when performing printing on the printing medium M, the control portion 300 moves the medium supporting portion 31 with the set printing medium M from the set position to the printing position so as to place the printing medium M at the printing region PA by controlling the medium support mechanism 30. Next, the control portion 300 moves the moisturizing cap 71 from the capping position to the non-capping position so as to release the standby capping by controlling the moisturizing portion 70.

Next, the control portion 300 moves the liquid ejecting portion 10 from the standby position to a position where any of the nozzles N faces the printing medium M by controlling the ejecting portion moving mechanism 40. Then, the control portion 300 performs printing by causing the liquid ejecting portion 10 to eject ink to the printing medium M from the nozzle N while repeating the back and forth movement of the liquid ejecting portion 10 in the X-axis direction and the movement of the liquid ejecting portion 10 in the +Y direction by controlling the ejecting portion moving mechanism 40. In addition, for example, when a predetermined time has elapsed during the printing, the control portion 300 performs the flushing of ejecting the ink from the nozzle N of the liquid ejecting portion 10 by moving the liquid ejecting portion 10 to a position facing the liquid reception portion 81 of the liquid reception portion 80 by controlling the ejecting portion moving mechanism 40.

In addition, when performing the maintenance of the liquid ejecting portion 10, the control portion 300 moves the liquid ejecting portion 10 to a position where any of the nozzle rows 12*a*, 12*b*, 12*c* and 12*d* faces the suctioning cap 61 by controlling the ejecting portion moving mechanism 40 with the suctioning cap 61 located at the non-capping position. Then, the control portion 300 moves the suctioning cap 61 to the suction-enabled position by controlling the cleaning portion driving mechanism 63 and causes the suction pump 65 to perform the suction operation. Then, the control portion 300 moves the suctioning cap 61 from the suction-enabled position to the non-capping position by controlling the cleaning portion driving mechanism 63.

Next, the control portion 300 moves the wiper 51 to the wipeable position by controlling the wiping portion driving mechanism 57. Then, the control portion 300 moves the liquid ejecting portion 10 to the position on the −Y direction side of the belt-shaped member 52 by controlling the ejecting portion moving mechanism 40. Further, the control portion 300 wipes the nozzle surface 11 with the wiping portion 50 by moving the liquid ejecting portion 10 in the +Y direction.

Next, the control portion 300 performs the flushing of ejecting the ink from the nozzle N of the liquid ejecting portion 10 by moving the liquid ejecting portion 10 to a position facing the liquid reception portion 81 of the liquid reception portion 80 by controlling the ejecting portion moving mechanism 40. When the maintenance of the liquid ejecting portion 10 is completed, the control portion 300 moves the liquid ejecting portion 10 to the standby position by controlling the ejecting portion moving mechanism 40. Then, the control portion 300 performs the standby capping with the moisturizing portion 70 by moving the moisturizing cap 71 from the non-capping position to the capping position by controlling the moisturizing cap lifting mechanism 73.

In the above-described manner, the liquid ejecting device 100 according to Embodiment 1 provides the following effects.

The liquid ejecting device 100 includes the base portion 101, the liquid ejecting portion 10, the medium supporting portion 31 and the maintenance portion MP. The liquid ejecting portion 10 is provided at the base portion 101 so as to be movable in the Y-axis direction and the X-axis direction of the base portion 101, and the liquid ejecting portion 10 performs printing by ejecting ink to the printing medium M from the nozzle N. The medium supporting portion 31 is provided at the base portion 101 and supports the printing medium M in the printing region PA where the liquid ejecting portion 10 performs printing. The maintenance portion MP is provided at the base portion 101 and disposed in the region on the +X direction side of the printing region PA in the X-axis direction. The maintenance portion MP includes the moisturizing portion 70 that can form the closed space to which the nozzle N opens, the cleaning portion 60 that can perform cleaning by forcibly discharging ink from the nozzle N, and the wiper 51 that can wipe the nozzle surface 11 where the nozzle N is provided, and the moisturizing portion 70, the cleaning portion 60 and the wiper 51 are disposed side by side in the Y-axis direction. In this manner, the size of the liquid ejecting device 100 is less increased.

In the maintenance portion MP, the moisturizing portion 70, the cleaning portion 60 and the wiper 51 are disposed in this order from the −Y direction side toward the +Y direction side in the Y-axis direction. In this manner, the time from the standby capping state with the moisturizing portion 70 to the start of the cleaning with the cleaning portion 60 can be easily shortened. In addition, the time from the completion of the cleaning with the cleaning portion 60 to the start of the wiping with the wiper 51 can be easily shortened.

During the non-printing state, the liquid ejecting portion 10 is located at the position where the moisturizing portion 70 can form the closed space. In this manner, the evaporation of the moisture from the nozzle N during the non-printing state can be suppressed.

The moisturizing portion 70 is disposed on the −Y direction side than the printing region PA in the Y-axis direction. In this manner, even in the case where the moisturizing portion 70 is disposed in the liquid ejecting device 100 in addition to the cleaning portion 60 and the wiper 51, increase of the size of the liquid ejecting device 100 in the scanning direction can be suppressed.

The wiper 51 is attachable and detachable from the +Y direction side in the Y-axis direction. In this manner, the ease of replacement of the wiper 51 can be increased.

the liquid ejecting device 100, further comprising a waste liquid container mounting portion 99 to which a waste liquid container 91 is attachable to and detachable from the +Y direction side in the Y-axis direction, the waste liquid container 91 can store the waste liquid discharged from the liquid ejecting portion 10, and when viewed from the direction along the Z-axis direction, at least a part of the waste liquid container mounting portion 99 overlaps the wiper 51. In this manner, the ease of replacement of the waste liquid container 91 can be increased, and increase of the size of the liquid ejecting device 100 in the scanning direction and depth direction can be suppressed.

the liquid ejecting device 100, further comprising the liquid container mounting portion 29 to which the liquid container 21 is attachable to and detachable from the +Y direction side in the Y-axis direction, the liquid container 21 that contains the ink to be supplied to the liquid ejecting portion 10, and the liquid container mounting portion 29 is disposed in the region on the −X direction side of the printing region PA in the X-axis direction. In this manner, the ease of replacement of the liquid container 21 can be increased, and the size of the liquid ejecting device 100 in the vertical direction and depth direction can be suppressed.

The liquid ejecting device 100 includes the base portion 101, the liquid ejecting portion 10, the medium supporting portion 31 and the liquid reception portion 80, and the liquid reception portion 80 is provided over the Y-axis direction of the printing region PA. The liquid ejecting portion 10 is provided at the base portion 101 so as to be movable in the Y-axis direction and the X-axis direction of the base portion 101 and the liquid ejecting portion 10 performs printing by ejecting ink from the nozzle N to the printing medium M. The medium supporting portion 31 is provided at the base portion 101 and supports the printing medium M in the printing region PA where the liquid ejecting portion 10 performs printing. The liquid reception portion 80 is provided at the base portion 101 and disposed in at least one of the region on the +X direction side and the region on the −X direction side of the printing region PA in the X-axis direction. The liquid reception portion 80 can receive the ink ejected as waste liquid from the nozzle N. In this manner, with the liquid reception portion 80 provided at the base portion 101, the configuration of the liquid ejecting device 100 is less complicated.

The liquid reception portion 80 is provided at a position adjacent to the medium supporting portion 31 located at the printing region PA. In this manner, the time required for the flushing during the printing is easily shortened. Thus, the time required for printing is easily shortened.

In the liquid ejecting device 100, the waste liquid container 91 that can store the waste liquid discharged from the liquid ejecting portion 10 further includes the waste liquid container mounting portion 99 that is attachable and detachable from the +Y direction side in the Y-axis direction, and at least a part of the liquid reception portion 80 overlaps the waste liquid container mounting portion 99 as viewed from the direction along Z-axial direction. In this manner, the ease of replacement of the waste liquid container 91 can be increased, and increase of the size of the liquid ejecting device 100 in the scanning direction and depth direction can be suppressed.

The bottom surface of the liquid reception portion 80 includes the bottom wall 88 tilted to the +Z direction from the +Y direction side toward the −Y direction side in the Y-axis direction, and at least a part of the bottom wall 88 overlaps the waste liquid container mounting portion 99 as viewed in the direction along the Z-axis direction. In this manner, increase of the size of the liquid ejecting device 100 in the vertical direction can be suppressed.

The liquid ejecting device 100 further includes the cleaning portion 60 provided in the base portion 101 and disposed in the region on the +X direction side of the printing region PA in X-axis direction, and the cleaning portion 60 includes the suctioning cap 61 that can form the closed space to which the nozzle N opens, the suction pump 65 including the first suction portion 65A that can suction ink from the nozzle N through the closed space, and the first waste liquid tube 68 through which the ink suctioned by the first suction portion 65A flows. The first waste liquid tube 68 is connected at a position on the −Z direction than the bottom wall 88 in the liquid reception portion 80. In this manner, the ink ejected to the liquid reception portion 80 from the nozzle N is easily washed away by the ink entering the liquid reception portion 80 through the first waste liquid tube 68.

The cleaning portion 60 further includes the second waste liquid tube 69 connected at a position on the +Z direction side than the bottom wall 88 in the liquid reception portion 80, and the suction pump 65 includes the second suction portion 65B that can suction the ink in the liquid reception portion 80 through the second waste liquid tube 69. In this manner, suction of ink from the nozzle N and suction of ink from the liquid reception portion 80 can be performed with one suction pump 65. In addition, the ink suctioned from the nozzle N and the ink ejected from the nozzle N to the liquid reception portion 80 can be collectively suctioned.

The waste liquid container mounting portion 99 includes the discharge portion 97 that discharges the ink suctioned by the second suction portion 65B, and the discharge portion 97 is connected to the waste liquid container 91. In this manner, the ink as waste liquid that is not used for printing can be contained in the waste liquid container 91.

The liquid ejecting device 100 further includes the moisturizing portion 70 that is provided at the base portion 101 and can form the closed space to which the nozzle N opens, and the wiping portion 50 that is provided at the base portion 101 and can wipe the nozzle surface 11 where the nozzle N is provided. The moisturizing portion 70, the cleaning portion 60 and the wiping portion 50 disposed side by side in the Y-axis direction make up the maintenance portion MP, and the liquid reception portion 80 is disposed between the medium supporting portion 31, and the moisturizing portion 70, the cleaning portion 60 and the wiping portion 50 making up the maintenance portion MP, in the X-axis direction. In this manner, the time required for the flushing during the printing is easily shortened. Thus, the time required for printing is easily shortened.

The liquid reception portion 80 is disposed in the region on the −X direction side of the printing region PA in the X-axis direction. In this manner, the time required for the flushing during the printing is easily shortened. Thus, the time required for printing is easily shortened.

Basically, the liquid ejecting device 100 according to the embodiment of the present disclosure has the above-described configurations, but it is of course possible to make partial configuration changes or omissions within the scope that does not depart from the gist of the present disclosure. In addition, the above-described embodiment and other embodiments described below can be implemented in combination with each other to the extent that they are not technically inconsistent. Other embodiments are described below.

In the above-mentioned embodiment, the moisturizing portion 70 may not be disposed on the +X direction side than the liquid reception portion 80 in the X-axis direction. In this case, for example, the moisturizing cap 71 of the moisturizing portion 70 may be disposed at a position overlapping the liquid reception portion 80, on the +X direction side than the printing region PA in the X-axis direction.

In the above-mentioned embodiment, the moisturizing portion 70 may not be disposed on the −Y direction side than the printing region PA in the Y-axis direction. For example, at least a part of the moisturizing portion 70 may be disposed at a position overlapping the printing region PA in the Y-axis direction.

In the above-mentioned embodiment, the maintenance portion MP may not be disposed in the order of the moisturizing portion 70, the cleaning portion 60 and the wiping portion 50 from the −Y direction side toward the +Y direction side in the Y-axis direction. For example, the maintenance portion MP may be disposed in the order of the cleaning portion 60, the moisturizing portion 70 and the wiping portion 50 from the −Y direction side toward the +Y direction side in the Y-axis direction.

In the above-mentioned embodiment, the wiper 51 may not include the belt-shaped member 52 as long as the nozzle surface 11 of the liquid ejecting portion 10 can be wiped. For example, the wiper 51 may include a belt-shaped elastomer member as a wiping member in an orientation with the Y-axis direction as the thickness direction.

In the above-mentioned embodiment, the wiper 51 may not be attachable or detachable from the +Y direction side in the Y-axis direction. For example, the wiper 51 may be provided to be attachable and detachable from the −Z direction side or the +X direction side. In the above-mentioned cases, for example, the maintenance portion MP may be disposed in the order of the moisturizing portion 70, the wiping portion 50 and the cleaning portion 60 from the −Y direction side toward the +Y direction side in the Y-axis direction. Alternatively, the maintenance portion MP may be disposed in the order of the cleaning portion 60, the wiping portion 50 and the moisturizing portion 70 from the −Y direction side toward the +Y direction side in the Y-axis direction. In addition, in the above-mentioned cases, the wiper 51 may not be located at a position overlapping the waste liquid container mounting portion 99 as viewed in the direction along the Z-axis direction.

In the above-mentioned embodiment, the wiper 51 may not be attachable or detachable. In this case, the wiper mounting portion 59 may be omitted.

In the above-mentioned embodiment, the waste liquid container 91 may not be attachable or detachable. In this case, the waste liquid container mounting portion 99 may be omitted.

In the above-mentioned embodiment, the suctioning cap 61 of the cleaning portion 60 may include a suctioning cap 61*a* (not illustrated in the drawing) corresponding to the nozzle row 12*a*, a suctioning cap 61*b* (not illustrated in the drawing) corresponding to the nozzle row 12*b*, a suctioning cap 61*c* (not illustrated in the drawing) corresponding to the nozzle row 12*c*, and a suctioning cap 61*d* (not illustrated in the drawing) corresponding to the nozzle row 12*d*. In this case, each of the suctioning caps 61*a*, 61*b*, 61*c* and 61*d* includes the recess 66. In addition, the suctioning caps 61*a*, 61*b*, 61*c* and 61*d* are held by the suctioning cap holding part 62. In addition, the suctioning caps 61*a*, 61*b*, 61*c* and 61*d* are held by the suctioning cap holding part 62.

What is claimed is:

1. A liquid ejecting device, comprising:
- a base portion;
- a liquid ejecting portion provided at the base portion and configured to perform printing by ejecting liquid from a nozzle to a medium, the liquid ejecting portion being movable in a depth direction of the base portion and a scanning direction intersecting the depth direction;
- a medium supporting portion provided at the base portion and configured to support the medium in a printing region where the liquid ejecting portion performs the printing; and
- a maintenance portion provided at the base portion and disposed on one side outside the printing region in the scanning direction, wherein
- the maintenance portion includes:
- a moisturizing portion configured to form a closed space to which the nozzle opens;
- a cleaning portion configured to perform cleaning by forcibly discharging the liquid from the nozzle; and
- a wiper configured to wipe a nozzle surface where the nozzle is provided, and
- the moisturizing portion, the cleaning portion, and the wiper are disposed side by side in the depth direction.

2. The liquid ejecting device according to claim 1, wherein the maintenance portion is disposed in an order of the moisturizing portion, the cleaning portion, and the wiper from a far side to a near side in the depth direction.

3. The liquid ejecting device according to claim 1, wherein
- while printing is not performed, the liquid ejecting portion is located at a position where the closed space is formable by the moisturizing portion.

4. The liquid ejecting device according to claim 3, wherein
- the moisturizing portion is disposed on a far side from the printing region in the depth direction.

5. The liquid ejecting device according to claim 1, wherein
- the wiper is attachable to and detachable from a near side in the depth direction.

6. The liquid ejecting device according to claim 5, further comprising:
- a first mounting portion to which a waste liquid container is attachable to and detachable from a near side in the depth direction, the waste liquid container being configured to store waste liquid discharged from the liquid ejecting portion, and
- when viewed from a direction along a vertical direction, at least a part of the first mounting portion overlaps the wiper.

7. The liquid ejecting device according to claim 1, further comprising:
- a second mounting portion to which a liquid container is attachable to and detachable from a near side in the depth direction, the liquid container being configured to store the liquid to be supplied to the liquid ejecting portion, and
- the second mounting portion is disposed on another side outside the printing region in the scanning direction.

* * * * *